(12) United States Patent
Koike

(10) Patent No.: US 12,079,404 B2
(45) Date of Patent: Sep. 3, 2024

(54) TRANSMISSION DRIVER INCLUDING CIRCUITRY THAT TRANSMITS SIGNALS WITH DIFFERENT VOLTAGE RANGES WHILE OPERATING IN DIFFERENT MODES, ELECTRONIC DEVICE, AND CONTROL METHOD OF ELECTRONIC DEVICE

(71) Applicant: Wacom Co., Ltd., Saitama (JP)

(72) Inventor: Takeshi Koike, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/063,579

(22) Filed: Dec. 8, 2022

(65) Prior Publication Data

US 2023/0195245 A1 Jun. 22, 2023

(30) Foreign Application Priority Data

Dec. 22, 2021 (JP) ................................. 2021-207912
Jun. 16, 2022 (JP) ................................. 2022-097581
Aug. 24, 2022 (JP) ................................. 2022-133595

(51) Int. Cl.
*G06F 3/038* (2013.01)
*G06F 3/0354* (2013.01)

(52) U.S. Cl.
CPC ........ *G06F 3/0383* (2013.01); *G06F 3/03545* (2013.01)

(58) Field of Classification Search
CPC ............... G06F 3/03545; G06F 3/0383; G06F 3/04162; G06F 1/00; G06F 3/00; G06F 5/00; G06F 7/00; G06F 8/00; G06F 9/00; G06F 11/00; G06F 12/00; G06F 13/00; G06F 15/00; G06F 16/00
See application file for complete search history.

(56) References Cited

U.S. PATENT DOCUMENTS

| | | | |
|---|---|---|---|
| 2015/0286268 A1* | 10/2015 | Komatsu | G06F 3/04184 345/173 |
| 2018/0095495 A1* | 4/2018 | Katsurahira | G06F 1/24 |
| 2019/0146602 A1* | 5/2019 | Kadowaki | G06F 3/0418 345/174 |
| 2020/0225772 A1* | 7/2020 | Koike | G06F 3/0383 |
| 2021/0320783 A1* | 10/2021 | Masuda | H04L 7/0012 |

FOREIGN PATENT DOCUMENTS

JP 2019-091442 A 6/2019

* cited by examiner

*Primary Examiner* — Chun-Nan Lin
(74) *Attorney, Agent, or Firm* — Seed IP Law Group LLP

(57) ABSTRACT

A transmission driver receives an input signal, a first voltage, and a second voltage higher than the first voltage, and transmits a transmission signal according to the input signal, the transmission driver includes an output terminal that outputs the transmission signal and circuitry that is coupled to the output terminal and that operates in a first mode of transmitting the transmission signal with a first voltage range that ranges from the first voltage to the second voltage, and a second mode of transmitting the transmission signal with a second voltage range that ranges from the first voltage to a third voltage higher than the second voltage.

18 Claims, 15 Drawing Sheets

FIG. 14

| Cext1[%] | Cext1[pF] | Cext2[pF] | Cext1/Cext2 | Cext1//Cext2[pF] | V2[V] | V3[V] | C1norm | V3norm |
|---|---|---|---|---|---|---|---|---|
| 5 | 5 | 95 | 0.05 | 4.8 | 14.7 | 18.21 | 0.05 | 0.65 |
| 10 | 10 | 90 | 0.11 | 9.0 | 16.5 | 21.71 | 0.10 | 0.77 |
| 15 | 15 | 85 | 0.18 | 12.8 | 17.6 | 23.76 | 0.15 | 0.84 |
| 20 | 20 | 80 | 0.25 | 16.0 | 18.3 | 25.10 | 0.20 | 0.89 |
| 25 | 25 | 75 | 0.33 | 18.8 | 18.9 | 26.03 | 0.25 | 0.92 |
| 30 | 30 | 70 | 0.43 | 21.0 | 19.3 | 26.70 | 0.30 | 0.95 |
| 35 | 35 | 65 | 0.54 | 22.8 | 19.6 | 27.20 | 0.35 | 0.96 |
| 40 | 40 | 60 | 0.67 | 24.0 | 19.8 | 27.56 | 0.40 | 0.98 |
| 45 | 45 | 55 | 0.82 | 24.8 | 20.0 | 27.83 | 0.45 | 0.99 |
| 50 | 50 | 50 | 1.00 | 25.0 | 20.2 | 28.02 | 0.50 | 0.99 |
| 55 | 55 | 45 | 1.22 | 24.8 | 20.3 | 28.14 | 0.55 | 1.00 |
| 60 | 60 | 40 | 1.50 | 24.0 | 20.4 | 28.19 | 0.60 | 1.00 |
| 65 | 65 | 35 | 1.86 | 22.8 | 20.5 | 28.17 | 0.65 | 1.00 |
| 70 | 70 | 30 | 2.33 | 21.0 | 20.6 | 28.08 | 0.70 | 1.00 |
| 75 | 75 | 25 | 3.00 | 18.8 | 20.7 | 27.88 | 0.75 | 0.99 |
| 80 | 80 | 20 | 4.00 | 16.0 | 20.8 | 27.55 | 0.80 | 0.98 |
| 85 | 85 | 15 | 5.67 | 12.8 | 20.8 | 27.01 | 0.85 | 0.96 |
| 90 | 90 | 10 | 9.00 | 9.0 | 20.9 | 26.11 | 0.90 | 0.93 |
| 95 | 95 | 5 | 19.00 | 4.8 | 21.0 | 24.49 | 0.95 | 0.87 |
| 105 | 105 | 0 | - | 0.0 | 21.0 | 21.00 | 1.00 | 0.74 |

TRANSMISSION DRIVER INCLUDING CIRCUITRY THAT TRANSMITS SIGNALS WITH DIFFERENT VOLTAGE RANGES WHILE OPERATING IN DIFFERENT MODES, ELECTRONIC DEVICE, AND CONTROL METHOD OF ELECTRONIC DEVICE

BACKGROUND

Technical Field

The present disclosure relates to a transmission driver, and particularly, to a transmission driver, an electronic device provided with the transmission driver, and a control method of the electronic device.

Description of the Related Art

A transmission driver that transmits a transmission signal according to an input signal and an electronic device, such as a tablet terminal and a stylus, provided with the transmission driver have hitherto been known.

In relation to this, a tablet terminal is disclosed in Japanese Patent Laid-Open No. 2019-091442, the tablet terminal including a plurality of sensor electrodes, output signal lines each provided for each sensor electrode and connected to the sensor electrode, switches each provided for each output signal line, one end of the switch being connected to the output signal line, another end of the switch being connected to a short-circuit line, and a control signal line for controlling each switch. In the technique disclosed in Japanese Patent Laid-Open No. 2019-091442, the output signal line with the voltage in a high level and the output signal line with the voltage in a low level are short-circuited, and the charge is shared between the output signal lines to reduce power consumption.

The technique can be applied to electronic devices other than the tablet terminal, such as a stylus used together with the tablet terminal. However, depending on the type of stylus, in some cases, the transmission driver that outputs signals to the output signal lines may be a single unit, or a plurality of transmission drivers may be arranged at separate positions. Hence, there is a problem that the technique cannot be applied. In addition, the voltage difference between the high level and the low level of the signal may need to be large in an electromagnetic-coupling stylus.

BRIEF SUMMARY

The present disclosure has been made in view of the problems, and an object of the present disclosure is to provide a transmission driver that can independently reduce power consumption, an electronic device provided with the transmission driver, and a control method of the electronic device.

To solve the problems, a first aspect of the present disclosure provides a transmission driver that receives an input signal, a first voltage, and a second voltage higher than the first voltage and that transmits a transmission signal according to the input signal, the transmission driver includes an output terminal which, in operation, outputs the transmission signal; and circuitry coupled to the output terminal, wherein the circuitry, in operation, operates in: a first mode of transmitting the transmission signal with a first voltage range that ranges from the first voltage to the second voltage, and a second mode of transmitting the transmission signal with a second voltage ranges that ranges from the first voltage to third voltage higher than the second voltage.

A second aspect of the present disclosure provides the transmission driver further including a booster circuit which, in operation, supplies the third voltage.

A third aspect of the present disclosure provides the transmission driver further including an output control circuit which, in operation, receives the first voltage and one of the second voltage and the third voltage and outputs the transmission signal from the output terminal, and a short-circuit control element that controls supply of the second voltage to the output control circuit.

A fourth aspect of the aspect of the present disclosure provides the transmission driver in which the booster circuit includes a capacitive element.

A fifth aspect of the present disclosure provides the transmission driver in which, in the first mode, the second voltage is supplied to the output control circuit through the short-circuit control element, and in the second mode, the short-circuit control element cuts off the supply of the second voltage to the output control circuit, and the booster circuit supplies the third voltage to the output control circuit.

A sixth aspect of the present disclosure provides the transmission driver in which the output control circuit includes a positive power supply terminal and a negative power supply terminal, the first voltage is supplied to the negative power supply terminal, the second voltage is supplied to one end of the short-circuit control element, and another end of the short-circuit control element and one end of the capacitive element are connected to the positive power supply terminal.

A aspect of the seventh present disclosure provides the transmission driver further including a signal generation circuit which, in operation, generates a first signal and a second signal according to the input signal, in which the output control circuit sets, as the transmission signal, a first supplied voltage that is supplied to the positive power supply terminal or a second supplied voltage that is supplied to the negative power supply terminal, according to the first signal, and outputs the transmission signal, and the second signal is input to a second end of the capacitive element.

An eighth aspect of the present disclosure provides the transmission driver further including a control circuit which, in operation, controls the short-circuit control element to short-circuit the short-circuit control element when a first signal voltage of the first signal is the first voltage and to open the short-circuit control element when the first signal voltage of the first signal is a fourth voltage higher than the first voltage, in which the signal generation circuit generates the first signal such that the first signal voltage of the first signal is shifted from the first voltage to the fourth voltage at a first timing corresponding to a rise of the input signal and the first signal voltage of the first signal is shifted from the fourth voltage to the first voltage at a fourth timing at which a predetermined time period has passed from a third timing corresponding to a fall of the input signal, and the signal generation circuit generates the second signal such that the a second signal voltage of the second signal is shifted from the first voltage to fifth voltage higher than the first voltage at a second timing at which a predetermined time period has passed from the first timing and the second signal voltage of the second signal is shifted from the fifth voltage to the first voltage at the third timing.

A ninth aspect of the present disclosure provides the transmission driver in which a time period from the first timing to the second timing is equal to or smaller than half a time period from the first timing to the third timing, and a time period from the third timing to the fourth timing is equal to or smaller than half a time period from the second timing to the fourth timing.

A tenth aspect of the present disclosure provides the transmission driver in which the fourth voltage and the fifth voltage are equal to the second voltage.

An eleventh aspect of the present disclosure provides the transmission driver in which capacitance of the capacitive element is equal to or greater than ten times parasitic capacitance connected to the output terminal.

A twelfth aspect of the present disclosure provides the transmission driver such that the circuitry, in operation, operates in a third mode of transmitting the transmission signal with a third voltage range that ranges from the first voltage to sixth voltage higher than the third voltage.

A thirteenth aspect of the present disclosure provides the transmission driver further including a first booster circuit which, in operation, supplies the third voltage or the sixth voltage.

A fourteenth aspect of the present disclosure provides the transmission driver further including a second booster circuit which, in operation, supplies, to the first booster circuit, seventh voltage higher than the first voltage by a difference between the third voltage and the second voltage or an eighth voltage higher than the seventh voltage by a difference between the sixth voltage and the second voltage.

A fifteenth aspect of the present disclosure provides the transmission driver in which the first booster circuit includes a first capacitive element that supplies the third voltage or the sixth voltage from one end of the first capacitive element, the second booster circuit includes a second capacitive element that supplies the seventh voltage or the eighth voltage from one end of the second capacitive element to the first booster circuit, and a first capacitance of the first capacitive element is 0.6 times a total of the first capacitance of the first capacitive element and a second capacitance of the second capacitive element.

A sixteenth aspect of the present disclosure provides the transmission driver such that the circuitry, in operation, operates in a fourth mode of transmitting the transmission signal with a fourth voltage range that ranges from the first voltage to a ninth voltage that is voltage between the first voltage and the second voltage; and a fifth mode of transmitting the transmission signal with a fifth voltage range that ranges from the first voltage to a tenth voltage that is voltage between the second voltage and the third voltage.

A seventeenth aspect of the present disclosure provides the transmission driver further including a third booster circuit which, in operation, supplies the ninth voltage, the tenth voltage, or the third voltage.

An eighteenth aspect of the present disclosure provides the transmission driver in which the third booster circuit divides the first voltage and the second voltage to generate the ninth voltage and boosts the ninth voltage that is generated by an amount of the second voltage to generate the tenth voltage.

A nineteenth aspect of the present disclosure provides an electronic device including first electrodes that transmit and receive signals, and a transmission driver that receives an input signal, a first voltage, and a second voltage higher than the first voltage, generates a transmission signal according to the input signal, and transmits the transmission signal to corresponding one of the electrodes, in which the transmission driver, in operation, operates in a first mode of transmitting the transmission signal with a first voltage ranges that ranges from the first voltage to the second voltage, and a second mode of transmitting the transmission signal with a second voltage ranges that ranges from the first voltage to third voltage higher than the second voltage.

A twentieth aspect of the present disclosure provides the electronic device in which the transmission driver is mounted on a stylus, the first electrodes are mounted on the stylus and transmit and receive the signals through capacitive coupling between the first electrodes and second electrodes mounted on a sensor that is connected to a sensor controller, and the stylus side electrodes are mounted on the stylus.

A twenty-first aspect of the present disclosure provides a control method of an electronic device that operates in a first mode and a second mode, the electronic device including electrodes that transmit and receive signals, and a transmission driver that receives an input signal, a first voltage, and a-second voltage higher than the first voltage and that transmits a transmission signal to the electrodes according to the input signal, the control method including, in a first mode, transmitting the transmission signal with a first voltage ranges that ranges from the first voltage to the second voltage, and in a second mode, transmitting the transmission signal with a second voltage ranges that ranges from the first voltage to third voltage higher than the second voltage.

According to the present disclosure, the transmission driver can independently reduce the power consumption.

BRIEF DESCRIPTION OF THE SEVERAL VIEWS OF THE DRAWINGS

FIG. 14 is a chart illustrating an example of a relation between the capacitance of capacitive elements and the voltage of a transmission signal in the transmission driver according to the second embodiment.

DETAILED DESCRIPTION

Figure 1:
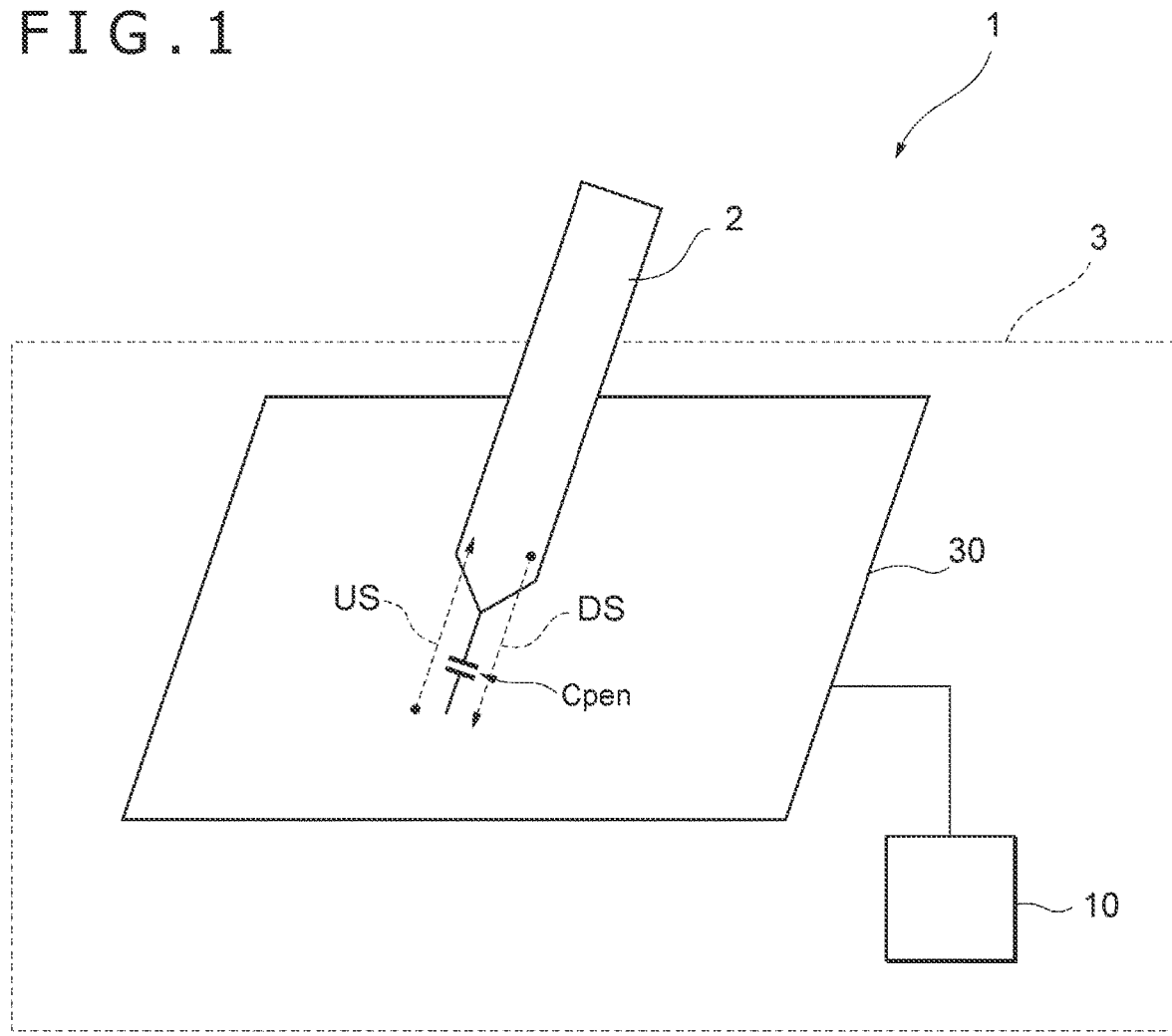
FIG. 1 depicts an example of a stylus system.

Embodiments of the present disclosure (hereinafter, referred to as "present embodiments") will now be described with reference to the attached drawings. To facilitate the understanding of the description, the same reference signs are provided as much as possible to the same constituent elements and steps in the drawings, and the description will not be repeated.

First Embodiment

A first embodiment will be described.
Circuit Configuration

FIG. 1 depicts an example of a stylus system 1 according to the present disclosure. The stylus system 1 is, for example, a system of an active capacitance type. The stylus system 1 includes a touch sensor 30 placed over a display apparatus such as a liquid crystal panel, a touch sensor mounted apparatus 3 including a sensor controller 10 that uses the touch sensor 30 to derive a current instruction position of the stylus 2 and that outputs the instruction position to a control circuit 12 along with operation state data, and a stylus 2 (active stylus) for inputting an instruction position, operation state data, such as pen pressure, and other data to the touch sensor mounted apparatus 3. The stylus 2 and the touch sensor mounted apparatus 3 are electronic devices and are capacitively coupled to each other through capacitance Cpen. The capacitance of the capacitance Cpen is typically smaller than 10 pF.

The stylus 2 is, for example, a stylus of an active capacitive coupling type (AES) that detects an uplink signal US transmitted from the sensor controller 10 at a predetermined cycle and that includes a power supply, a communication circuit, and electrodes for transmitting a downlink signal DS in a time period instructed based on the time of the detected uplink signal US.

The touch sensor mounted apparatus 3 is a computer owned by a user and includes, for example, a tablet, a smartphone, or a personal computer. The touch sensor mounted apparatus 3 detects the instruction position of the stylus 2 and executes various types of information processing according to the detection result. Specifically, the touch sensor mounted apparatus 3 transmits the uplink signal US to the stylus 2, detects the instruction position of the stylus 2 according to the result of reception of the downlink signal DS from the stylus 2, and executes a generation process of digital ink, a display process of a pointer, and the like. The touch sensor mounted apparatus 3 includes a host processor, a memory, a communication module (that are not illustrated), and the like in addition to the sensor controller 10 and the touch sensor 30.

Figure 2:
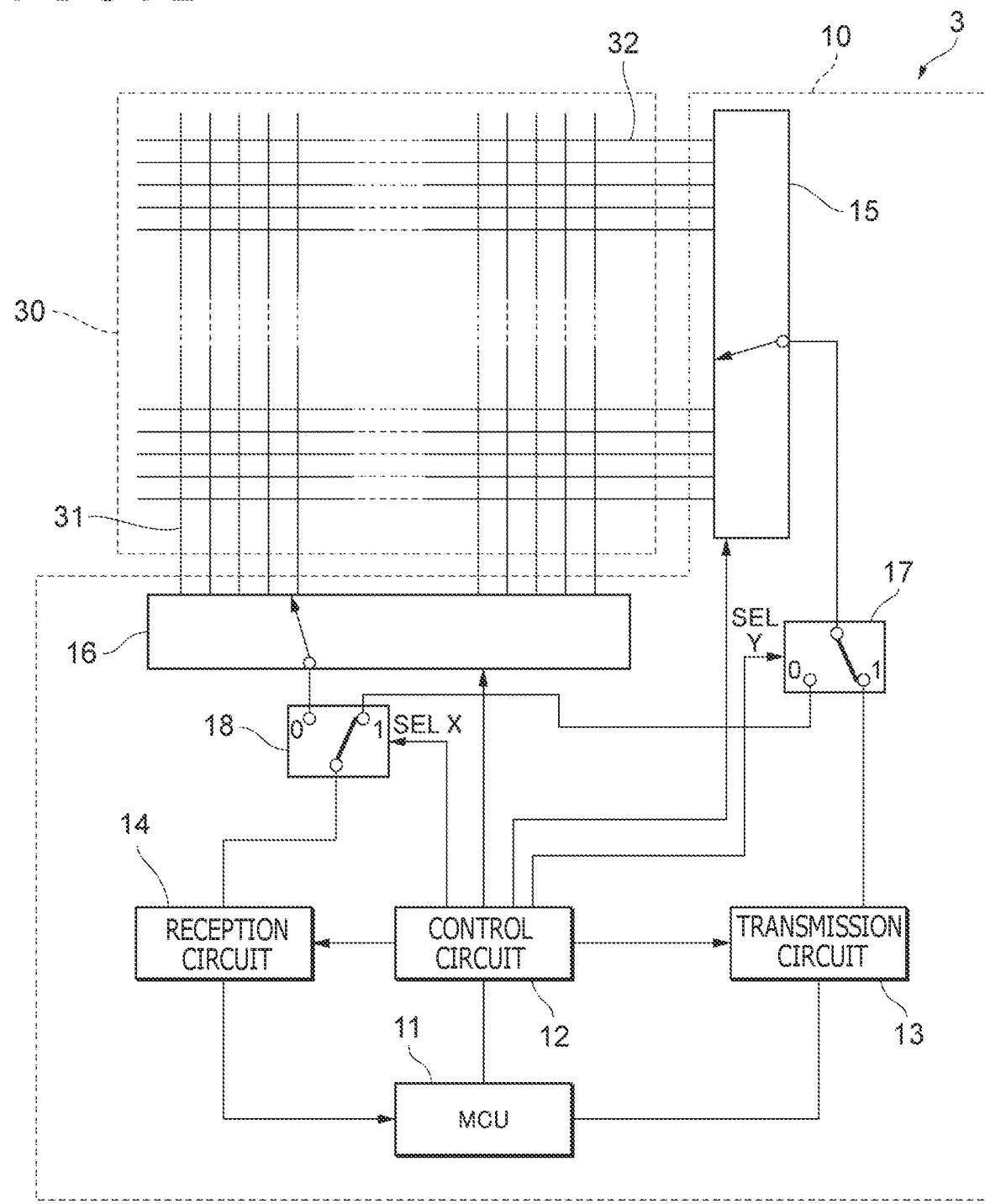
FIG. 2 depicts an example of a touch sensor mounted apparatus illustrated in FIG. 1.

FIG. 2 depicts an example of the touch sensor mounted apparatus 3 illustrated in FIG. 1.

The touch sensor 30 is a sensor of capacitance type including a plurality of detection electrodes arranged in a plane shape. The touch sensor 30 includes, for example, a plurality of X line electrodes (hereinafter, referred to as "linear electrodes 31") for detecting the position of the X-axis in the sensor coordinate system and a plurality of Y line electrodes (hereinafter, referred to as "linear electrodes 32") for detecting the position of the Y-axis in the sensor coordinate system. The linear electrodes 31 and the linear electrodes 32 may contain a transparent conductive material including indium tin oxide (ITO) or may include wire mesh sensors. Note that the touch sensor 30 may be a sensor of self-capacitance type including block-like electrodes arranged in a two-dimensional grid, instead of the sensor of mutual capacitance type.

The sensor controller 10 includes a micro controller unit (MCU) 11, the control circuit 12, a transmission circuit 13, a reception circuit 14, an output circuit 15, a detection circuit 16, and selection circuits 17 and 18.

The output circuit 15 is a circuit that selects one of the plurality of linear electrodes 32 or a plurality of linear electrodes 32 adjacent to each other, according to an instruction from the control circuit 12, amplifies an input signal transmitted from the control circuit 12 to a predetermined voltage, to set the input signal as an output signal, and outputs the output signal to the linear electrode 32. The detection circuit 16 is a circuit that selects one of the plurality of linear electrodes 31 or a plurality of linear electrodes 31 adjacent to each other, according to an instruction from the control circuit 12.

The selection circuit 17 is, for example, a multiplexer, and is a circuit for switching whether to use the linear electrode 32 selected by the output circuit 15, as an electrode for receiving a signal or as an electrode for transmitting a signal. When a selection signal SELY output from the control circuit 12 is in a low state "0," the selection circuit 17 connects the linear electrode 32 selected by the output circuit 15 to the reception circuit 14 through the selection circuit 18. On the other hand, when the selection signal SELY is in a high state "1," the selection circuit 17 supplies the input signal input from the control circuit 12 through the transmission circuit 13 to the linear electrode 32 selected by the output circuit 15.

The selection circuit 18 is, for example, a multiplexer, and selects a signal input through the selection circuit 17 from the linear electrode 32 selected by the output circuit 15 or a signal input from the linear electrode 31 selected by the detection circuit 16 and outputs the selected signal to the reception circuit 14. When a selection signal SELX output from the control circuit 12 is in the low state, the selection circuit 18 connects the linear electrode 32 selected by the output circuit 15 to the reception circuit 14. On the other hand, when the selection signal SELX is in the high state, the selection circuit 18 connects the linear electrode 32 selected by the output circuit 15 to the reception circuit 14 through the selection circuit 17.

The touch sensor mounted apparatus 3 includes the following four types of modes, and the control circuit 12 controls the circuits in the sensor controller 10 while switching the modes in the following order. The modes will be described in detail one by one.

A first mode is a mode of detecting the position of a finger. In the mode, the control circuit 12 puts the selection signal SELY into the high state and puts the selection signal SELX into the low state. That is, the transmission signal output from the control circuit 12 through the transmission circuit 13 and the output circuit 15 is supplied to the linear electrode 32 selected by the output circuit 15, and a touch detection signal is transmitted from the touch sensor 30. The linear electrode 31 selected by the detection circuit 16 is connected to the reception circuit 14. This configuration allows the MCU 11 to read a change in detection signal caused by contact of the finger with the sensor surface and calculate the coordinate position of the finger.

A second mode is a mode of transmitting the uplink signal US to the stylus 2. The control circuit 12 in this case puts the selection signal SELY into the high state. As a result, the transmission signal output from the control circuit 12 through the transmission circuit 13 and the output circuit 15 is supplied to the linear electrode 32 selected by the output circuit 15, and the uplink signal US is transmitted from the touch sensor 30. In this case, the output circuit 15 may select a neighborhood electrode instructed by the stylus 2 that is among the linear electrodes 32, to transmit the uplink signal US, or the output circuit 15 may select all of the linear electrodes 32 at the same time to transmit a trigger signal US_trg.

A third mode is a mode of detecting a position signal DS_pos transmitted by the stylus 2, to detect the position of the stylus 2. The control circuit 12 in this case puts the selection signal SELY into the low state, and the linear electrode 32 selected by the output circuit 15 is connected to the reception circuit 14 through the selection circuit 17. To obtain the X-axis coordinate of the stylus 2, the control circuit 12 puts the selection signal SELX into the low state and connects the linear electrode 31 selected by the detection circuit 16 to the reception circuit 14. In this state, the MCU 11 reads, as signal level values, data output from the reception circuit 14, while the detection circuit 16 sequentially selects, one by one, a plurality of linear electrodes 31, such as five linear electrodes 31, around the linear electrode 31 closest to the instruction position of the stylus 2. The MCU 11 calculates the X-axis coordinate of the stylus 2 in reference to the signal level distribution for the selected linear electrode 31. To obtain the Y-axis coordinate of the stylus 2, the control circuit 12 puts the selection signal SELX into the high state and connects the linear electrode 32 selected by the output circuit 15 to the reception circuit 14. In this state, the MCU 11 reads, as signal level values, data output from the reception circuit 14, while the output circuit 15 sequentially selects, one by one, a plurality of linear electrodes 32, such as five linear electrodes 32, around the linear electrode 32 closest to the instruction position of the stylus 2. The MCU 11 calculates the Y-axis coordinate of the stylus 2 in reference to the signal level distribution for the selected linear electrode 32.

A fourth mode is a mode of receiving a data signal DS_res transmitted by the stylus 2. Although either one of the linear electrode 31 and the linear electrode 32 may be used to receive the data signal DS_res, the linear electrode 31 is used to receive the data signal DS_res in the case described here. The control circuit 12 puts the selection signal SELX into the low state to connect the linear electrode 31 selected by the detection circuit 16 to the reception circuit 14. The control circuit 12 is operated such that the detection circuit 16 simultaneously selects a plurality of linear electrodes 31, such as three linear electrodes 31, around the linear electrode 31 closest to the instruction position of the stylus 2. In this state, the MCU 11 periodically reads the output from the reception circuit 14. Note that, in the case of using the linear electrode 32 to receive the data signal DS_res, the selection signal SELY can be put into the low state, and the selection signal SELX can be put into the high state.

This completes the description of the operation of the control circuit 12 in each mode. As can be understood from the description, the touch sensor mounted apparatus 3 is configured to use the same touch sensor 30 to transmit and receive signals. Other components in the touch sensor mounted apparatus 3 illustrated in FIG. 2 will be described below.

The MCU 11 is a microprocessor that includes a read only memory (ROM) and a random access memory (RAM) inside and that operates according to a predetermined program. The MCU 11 controls the control circuit 12 such that the control circuit 12 outputs the signals as described above, and executes a reading process for digital data output by the reception circuit 14.

The control circuit 12 is a logic circuit for accurately outputting each signal at a designated timing according to an instruction from the MCU 11.

Figure 3:
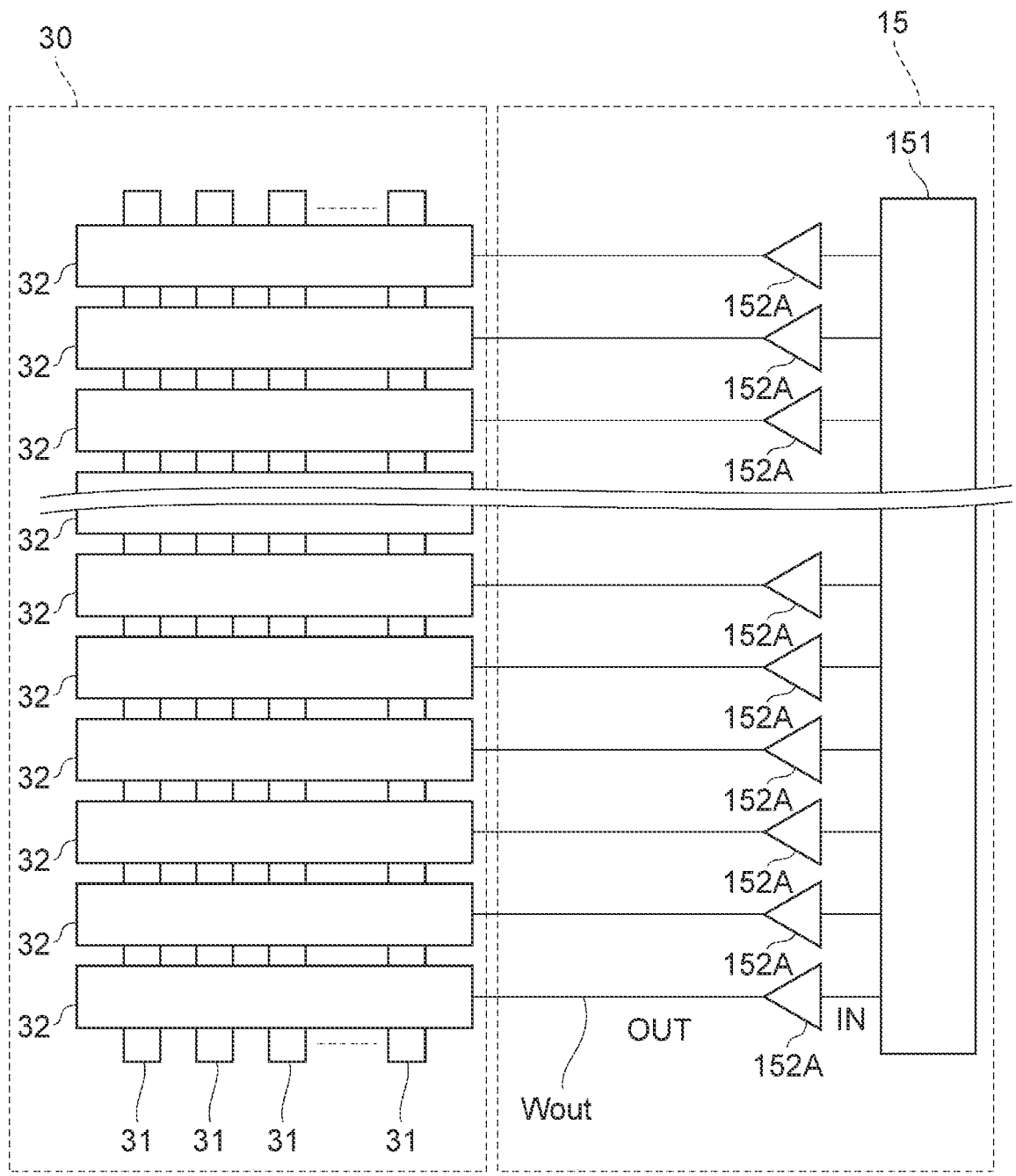
FIG. 3 depicts an example of part of a circuit configuration of an output circuit and a touch sensor illustrated in FIG. 2.

This completes the description of the configuration and the operation of the touch sensor mounted apparatus 3. Next, a configuration of circuits that function when the output circuit 15 transmits a signal to the linear electrode 32 will be described in detail. FIG. 3 depicts an example of part of the circuit configuration of the output circuit 15 and the touch sensor 30 that are illustrated in FIG. 2.

As illustrated in FIG. 3, the output circuit 15 includes a driver selection circuit 151 and a plurality of transmission drivers 152A.

The driver selection circuit 151 selects some of the plurality of transmission drivers 152A that transmit signals to the linear electrodes 32 according to an instruction of the control circuit 12. The driver selection circuit 151 sets data signals transmitted from the transmission circuit 13, as a plurality of input signals IN, and outputs each input signal IN to the corresponding transmission driver 152A.

One transmission driver 152A is provided for one linear electrode 32. The transmission driver 152A receives voltage GND (first voltage) from a reference line W_GND, receives voltage VDD (second voltage) from a power supply line W_VDD, amplifies the input signal IN input from the driver selection circuit 151, sets the amplified signal as a transmission signal OUT, and transmits the transmission signal OUT to the corresponding linear electrode 32 through an output signal line Wout. The transmission driver 152A includes a first mode and a second mode. The transmission driver 152A in the first mode amplifies the signal to the voltage difference from the voltage GND to the voltage VDD and outputs the amplified signal as the transmission signal OUT. On the other hand, the transmission driver 152A in the second mode amplifies the signal to the voltage difference from the voltage GND (first voltage) to voltage (third voltage) that allows a signal to be transmitted from the linear electrode 32 and outputs the amplified signal as the transmission signal OUT. Here, the voltage (third voltage) that allows a signal to be transmitted from the linear electrode 32 is voltage higher than 5 V and higher than the voltage VDD (second voltage), such as approximately 9 V.

Figure 4:
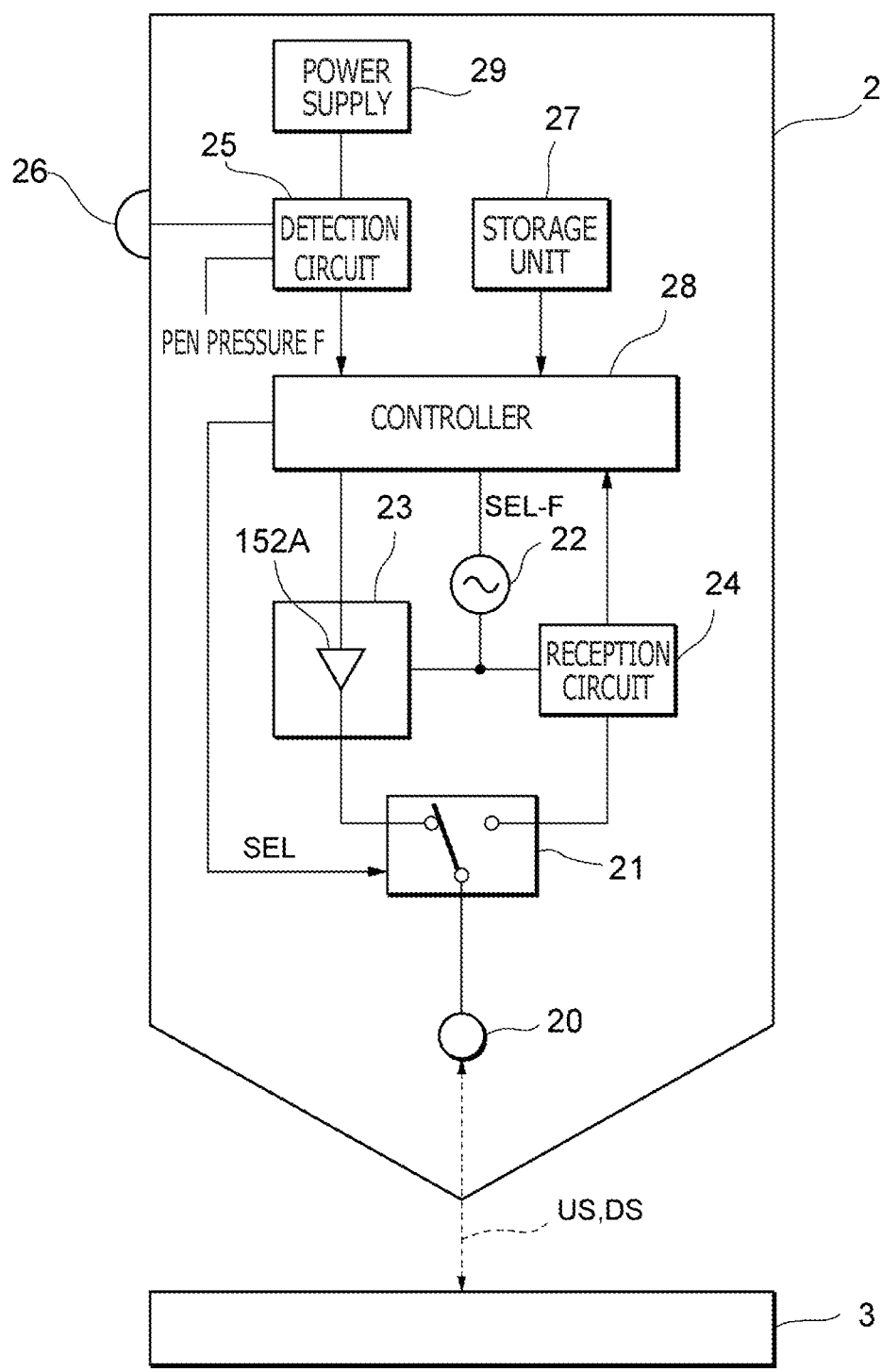
FIG. 4 depicts an example of a stylus illustrated in FIG. 1.

This completes the description of the configuration of the output circuit 15. Next, a configuration of circuits of the stylus 2 will be described in detail. FIG. 4 depicts an example of a circuit configuration of the stylus 2 illustrated in FIG. 1.

The stylus 2 includes, for example, an electrode 20, a selection circuit 21, an oscillator 22, a transmission circuit 23, a reception circuit 24, a detection circuit 25, an input unit 26, a storage unit 27, a controller 28, and a power supply 29.

The electrode 20 is a conductor in which charge corresponding to the downlink signal DS or the uplink signal US is induced.

The selection circuit 21 is, for example, a multiplexer, and switches the state of connection between the electrode 20 and one of the transmission circuit 23 and the reception circuit 24 according to a selection signal SEL input from the controller 28.

The oscillator 22 is an oscillation circuit that generates a carrier signal with a frequency used for communication between the touch sensor mounted apparatus 3 and the stylus 2, according to a frequency setting signal SEL_F input from the controller 28. The carrier signal may be a sine wave or may be a square wave of a clock pulse.

The transmission circuit 23 generates the downlink signal DS in reference to the data input from the controller 28 and transmits the generated downlink signal DS to the touch sensor mounted apparatus 3 through the electrode 20. The transmission circuit 23 includes the transmission driver 152A. The transmission driver 152A amplifies the voltage difference of the downlink signal DS to, for example, twice the power supply voltage of the stylus 2 and transmits the downlink signal DS with the amplified voltage difference to the touch sensor mounted apparatus 3. The downlink signal DS with the voltage difference amplified by the transmission driver 152A has voltage in which the low level (first voltage) is, for example, 0 V and the high level (third voltage) is equal to or greater than 15 V, such as approximately 20 V, and has a voltage difference of equal to or greater than 15 V, such as a voltage difference of approximately 20 V.

The reception circuit 24 detects and demodulates a change (signal) in the amount of charge induced in the electrode 20 and outputs the demodulated signal to the controller 28.

The detection circuit 25 acquires dynamic data that varies depending on the operation state of the stylus 2, such as on/off or other operation states of the input unit 26 that is a press button or the like provided on a side surface of the stylus 2, a value of pen pressure F detected by an unillustrated pen pressure detector, and remaining data of the power supply 29 that is a drive power supply of the stylus 2, and outputs the acquired data to the controller 28.

The storage unit 27 stores configuration data which is static data that does not vary depending on the operation state of the stylus 2, such as identification information of the stylus 2, vendor information indicating the manufacturer of the stylus 2, the type of the pen tip of the stylus 2 (such as a ballpoint pen and a brush), and the number of input units 26, and outputs the stored configuration data to the controller 28.

The controller 28 controls the transmission circuit 23 to transmit the downlink signal DS in a time period instructed by the sensor controller 10, based on the time of reception of the uplink signal US detected by the reception circuit 24 after the start of an operation (pen-down operation) of bringing the stylus 2 close to the touch sensor 30.

Figure 5:
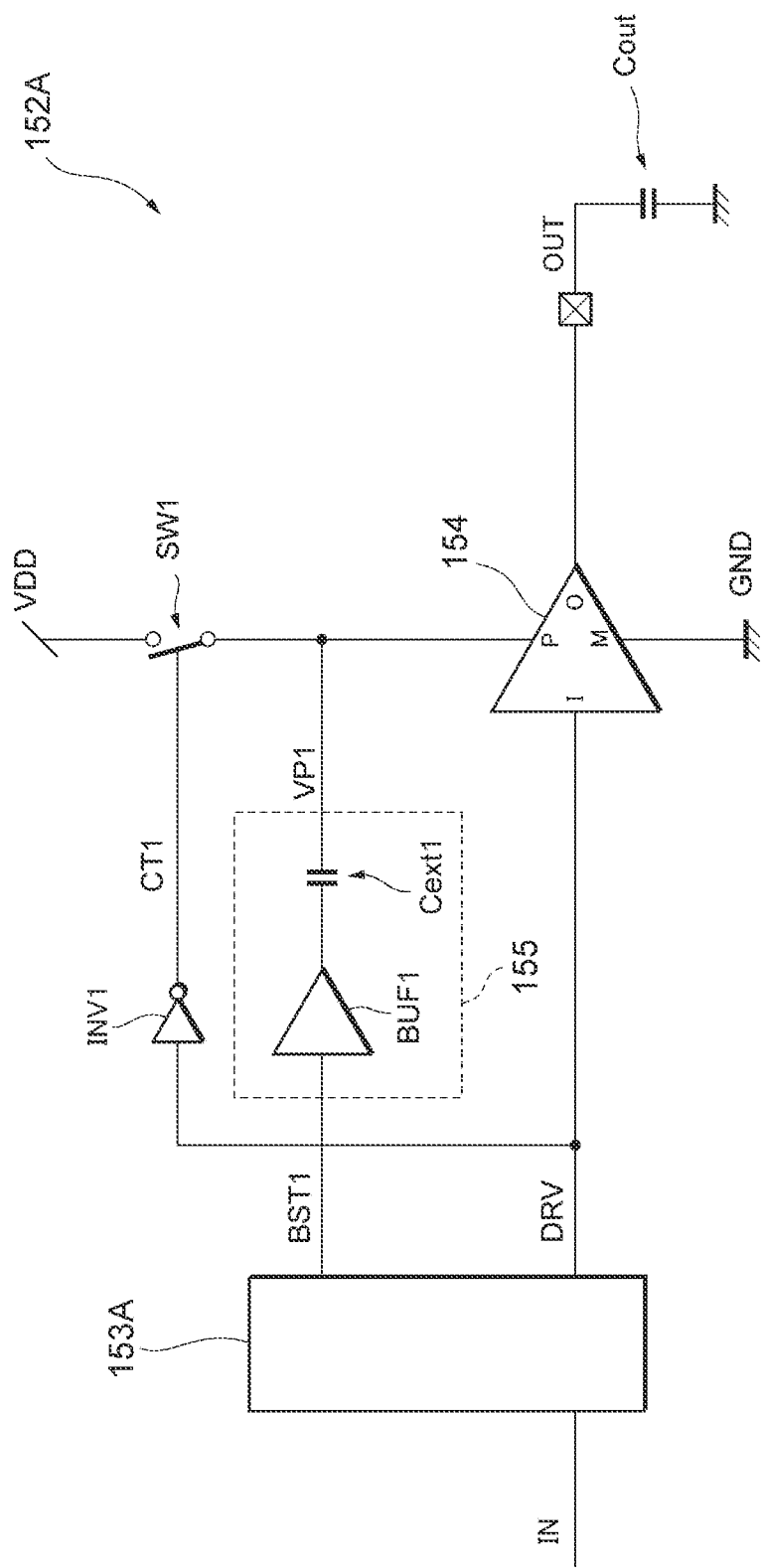
FIG. 5 depicts an example of a transmission driver according to a first embodiment.

This completes the description of the configuration of the stylus 2. Next, a configuration of circuits of the transmission driver 152A will be described in detail. FIG. 5 depicts an example of a circuit configuration of the transmission driver 152A according to the first embodiment.

As illustrated in FIG. 5, the transmission driver 152A includes, for example, a signal generation circuit 153A, an output control circuit 154, a NOT circuit INV1, a first booster circuit 155, and a short-circuit control element SW1. Note that parasitic capacitance Cout in FIG. 5 is load capacitance connected to an output of the transmission driver 152A. Specifically, the parasitic capacitance Cout represents combined capacitance of the electrode 20 and the capacitance Cpen when, for example, the transmission driver 152A is mounted on the stylus 2 and represents combined capacitance of the linear electrode 32 of the touch sensor 30 and the capacitance Cpen when, for example, the transmission driver 152A is mounted on the sensor controller 10.

The signal generation circuit 153A generates a drive signal DRV and a boost signal BST1 according to the input signal IN that is input. The signal generation circuit 153A outputs the generated drive signal DRV (first signal) to the NOT circuit INV1 and the output control circuit 154 and outputs the generated boost signal BST1 (second signal) to a buffer circuit BUF1 of the first booster circuit 155.

Specifically, the signal generation circuit 153A generates the drive signal DRV (first signal) such that the voltage is shifted from the low level (first voltage) to the high level (fourth voltage) at a first timing corresponding to the rise of the input signal IN and that the voltage is shifted from the high level (fourth voltage) to the low level (first voltage) at a fourth timing that is a timing at which a predetermined time period has passed from a third timing corresponding to the fall of the input signal IN. The signal generation circuit 153A generates the boost signal BST1 such that the voltage is shifted from the low level (first voltage) to the high level (fifth voltage) at a second timing that is a timing at which a predetermined time period has passed from the first timing and that the voltage is shifted from the high level (fifth voltage) to the low level (first voltage) at the third timing. The first timing here is, for example, a timing at which a predetermined clock has switched several times after the rise of the input signal IN or a timing of a rise of a signal with a predetermined delay from the input signal IN. The third timing is, for example, a timing at which a predetermined clock has switched several times after the fall of the input signal IN or a timing of a fall of a signal with a predetermined delay from the input signal IN.

The NOT circuit INV1 is, for example, an inverter circuit including a transistor, and functions as a control circuit that uses a control signal CT1 to control the short-circuit control element SW1. The NOT circuit INV1 performs a NOT operation of the drive signal DRV input from the signal generation circuit 153A, sets the signal that has been subjected to the operation, as the control signal CT1, and outputs the control signal CT1 to a control terminal of the short-circuit control element SW1.

The first booster circuit 155 includes, for example, the buffer circuit BUF1 and a capacitive element Cext1. The first booster circuit 155 boosts the voltage of a node connected to the output side, according to the boost signal BST1 output from the signal generation circuit 153A, and supplies the boosted voltage (third voltage) to a positive power supply terminal P of the output control circuit 154. Specifically, when the voltage of the boost signal BST1 output from the signal generation circuit 153A is in the high level (fifth voltage), the first booster circuit 155 boosts the voltage of the node connected to the output side and supplies the boosted voltage to the positive power supply terminal P of the output control circuit 154. On the other hand, when the voltage of the boost signal BST1 is in the low level (first voltage), the first booster circuit 155 stops the boost and supplies the voltage that has not been boosted (second voltage) to the positive power supply terminal P of the output control circuit 154.

The buffer circuit BUF1 is, for example, a buffer circuit including a metal oxide semiconductor (MOS) transistor. The buffer circuit BUF1 enhances the boost signal BST1 output from the signal generation circuit 153A and outputs the enhanced boost signal BST1 to the capacitive element Cext1. The buffer circuit BUF1 reduces or eliminates the electrical effect that the capacitive element Cext1 and the signal generation circuit 153A exert on each other. Although the buffer circuit BUF1 is provided on the transmission driver 152A in the first embodiment, the buffer circuit BUF1 may not be provided, and the boost signal BST1 may directly be input from the signal generation circuit 153A to one end of the capacitive element Cext1.

One end of the capacitive element Cext1 is connected to an output terminal of the buffer circuit BUF1, and the other end of the capacitive element Cext1 is connected to the other end of the short-circuit control element SW1 and the positive power supply terminal P of the output control circuit 154. The capacitive element Cext1 supplies voltage VP2 to the positive power supply terminal P of the output control circuit 154. The capacitive element Cext1 receives the voltage VDD from the power supply line W_VDD when the short-circuit control element SW1 is short-circuited. The capacitance of the capacitive element Cext1 is, for example, 1 to 10 uF and is typically 1 uF.

The short-circuit control element SW1 is, for example, a switch element or a transistor. One end of the short-circuit control element SW1 is connected to the power supply line W_VDD, and the other end of the short-circuit control element SW1 is connected to the other end of the capacitive element Cext1 and the positive power supply terminal P of the output control circuit 154. The short-circuit control element SW1 short-circuits or opens both ends according to the control signal CT1 input to the control terminal. Specifically, when the state of the control signal CT1 is the high state, the short-circuit control element SW1 short-circuits both ends and supplies the voltage VDD of the power supply line W_VDD to the positive power supply terminal P of the output control circuit 154 and the capacitive element Cext1. On the other hand, when the state of the control signal CT1 is the low state, the short-circuit control element SW1 opens both ends and stops the supply of the voltage VDD of the power supply line W_VDD.

The output control circuit 154 enhances the drive signal DRV input from the signal generation circuit 153A to an input terminal I, according to the voltage supplied to the positive power supply terminal P and the voltage supplied to a negative power supply terminal M, and transmits the signal as the transmission signal OUT from an output terminal O to the electrode 20 or the linear electrode 32. Specifically, the output control circuit 154 sets the voltage of the transmission signal OUT to the voltage supplied to the positive power supply terminal P, when the state of the drive signal DRV is the high state, and sets the voltage of the transmission signal OUT to the voltage supplied to the negative power supply terminal M, when the state of the drive signal DRV is the low state. The output control circuit 154 then outputs the transmission signal OUT from the output terminal O.

In the transmission driver 152A configured in this way, the short-circuit control element SW1 short-circuits both ends when the state of the drive signal DRV corresponding to the input signal IN is the low state and opens both ends when the state of the drive signal DRV is the high state. While the short-circuit control element SW1 is short-circuited, the operation mode of the transmission driver 152A is the first mode. The voltage VDD (second voltage) is supplied from the power supply line W_VDD to the positive power supply terminal P of the output control circuit 154 and the other end of the capacitive element Cext1, and the voltage GND (first voltage: such as 0 V) of the reference line W_GND is supplied to one end of the capacitive element Cext1.

On the other hand, while the short-circuit control element SW1 is open, the operation mode of the transmission driver 152A is the second mode, and the short-circuit control element SW1 cuts off the supply of the voltage VDD to the output control circuit 154. Voltage VP1 is supplied from the other end of the capacitive element Cext1 to the positive power supply terminal P of the output control circuit 154. While the short-circuit control element SW1 is open, the voltage VP1 is voltage equivalent to the sum of the voltage VDD and the voltage of one end of the capacitive element Cext1 determined by the boost signal BST1 corresponding to the input signal IN. Specifically, the voltage VP1 is the voltage VDD (second voltage) when the voltage of one end of the capacitive element Cext1 is the voltage GND, and the voltage VP1 is the voltage (third voltage) that is twice the voltage VDD when the voltage of the capacitive element Cext1 is the voltage VDD.

The transmission driver 152A sets, as the transmission signal OUT, the voltage supplied to the positive power supply terminal P of the output control circuit 154 or the voltage supplied to the negative power supply terminal M of the output control circuit 154, according to the state of the input signal IN, and transmits the transmission signal OUT to the electrode 20 or the linear electrode 32. That is, the transmission driver 152A generates the transmission signal OUT in which the voltage shifts to the voltage VDD (second voltage), the voltage (third voltage) that is twice the voltage VDD, and the voltage GND (first voltage), according to the input signal IN, and transmits the transmission signal OUT to the electrode 20 or the linear electrode 32.

Flow of a Series of Operations Regarding Transmission Driver

Figure 6:
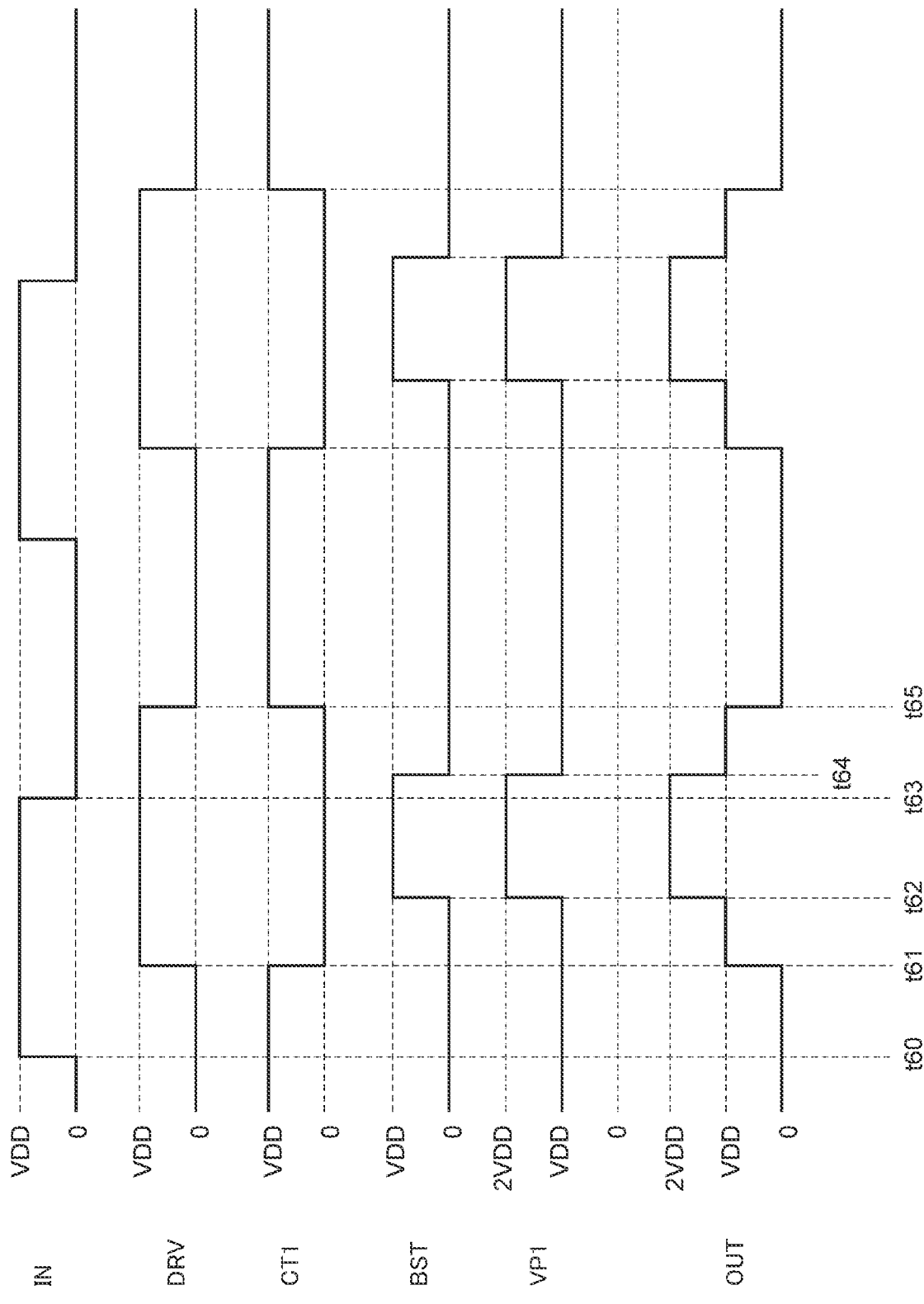
FIG. 6 is a timing chart illustrating an example of a shift in voltage of each signal in the transmission driver according to the first embodiment.

This completes the description of the configuration of the transmission driver 152A. Next, the shift in the voltage of each signal in the transmission driver 152A will be described in detail. FIG. 6 is a timing chart illustrating an example of the shift in the voltage of each signal in the transmission driver 152A according to the first embodiment.

At time t60, the operation mode of the transmission driver 152A is the first mode. At time t60, the driver selection circuit 151 or the controller 28 shifts the voltage of the input signal IN from 0 V (first voltage) to the voltage VDD (fourth voltage). At time t60, the signal generation circuit 153A detects a rise in the voltage of the input signal IN. At time t60, the short-circuit control element SW1 is short-circuited, and the voltage VDD is supplied from the power supply line W_VDD to the positive power supply terminal P of the output control circuit 154 and the other end of the capacitive element Cext1. At time t60, the signal generation circuit 153A sets the voltage of the boost signal BST1 to 0 V (first voltage) and outputs the boost signal BST1 to the buffer circuit BUF1. Accordingly, the voltage VP1 is the voltage VDD at time t60. As a result, at time t60, the output control circuit 154 sets the voltage of the transmission signal OUT to 0 V (first voltage) and transmits the transmission signal OUT to the electrode 20 or the linear electrode 32.

At time t61, the signal generation circuit 153A shifts the voltage of the drive signal DRV from 0 V (first voltage) to the voltage VDD (fifth voltage) according to a rise of the input signal IN. At time t61, the NOT circuit INV1 shifts the voltage of the control signal CT1 from the voltage VDD (fifth voltage) to 0 V (first voltage). At time t61, both ends of the short-circuit control element SW1 are opened according to the control signal CT1 in which the voltage is 0 V (first voltage). At time t61, the supply of the voltage VDD (second voltage) from the power supply line W_VDD to the positive power supply terminal P of the output control circuit 154 and the other end of the capacitive element Cext1 stops. At time t61, the voltage VP1 is the voltage VDD (second voltage). At time t61, the output control circuit 154 shifts the voltage of the transmission signal OUT from 0 V (first voltage) to the voltage VDD (second voltage) supplied to the positive power supply terminal P, according to the drive signal DRV.

At time t62, the operation mode of the transmission driver 152A is switched from the first mode to the second mode. At time t62, the signal generation circuit 153A shifts the voltage of the boost signal BST1 from 0 V (first voltage) to the voltage VDD (fifth voltage). At time t62, the buffer circuit BUF1 shifts the voltage of one end of the capacitive element Cext1 from 0 V (first voltage) to the voltage VDD (fifth voltage). In association with this, the capacitive element Cext1 tries to hold the voltage difference between the two ends, and the voltage VP1 of the other end of the capacitive element Cext1 shifts at time t62 from the voltage VDD (second voltage) to the voltage (third voltage: 2×voltage VDD) equivalent to the sum of the voltage VDD and the voltage (fifth voltage: voltage VDD) of one end of the capacitive element Cext1. As a result, at time t62, the output control circuit 154 shifts the voltage of the transmission signal OUT from the voltage VDD (second voltage) to the voltage VP1 (third voltage: 2×voltage VDD) supplied to the positive power supply terminal P.

At time t63, the driver selection circuit 151 or the controller 28 shifts the voltage of the input signal IN from the voltage VDD (fourth voltage) to 0 V (first voltage). At time t63, the signal generation circuit 153A detects a fall in the voltage of the input signal IN. At time t63, the output control circuit 154 keeps the voltage of the transmission signal OUT set to the voltage VP1 (third voltage: 2×voltage VDD) and transmits the transmission signal OUT to the electrode 20 or the linear electrode 32.

At time t64, the operation mode of the transmission driver 152A is switched from the second mode to the first mode. At time t64, the signal generation circuit 153A shifts the voltage of the boost signal BST1 from the voltage VDD (fifth voltage) to 0 V (first voltage). At time t64, the buffer circuit BUF1 shifts the voltage of one end of the capacitive element Cext1 from the voltage VDD (fifth voltage) to 0 V (first voltage). In association with this, the capacitive element Cext1 tries to hold the voltage difference between the two ends, and the voltage VP1 of the other end of the capacitive element Cext1 shifts at time t64 from the voltage (third voltage) that is twice the voltage VDD to the voltage VDD (second voltage). As a result, at time t64, the output control circuit 154 shifts the voltage of the transmission signal OUT from the voltage (third voltage) that is twice the voltage VDD to the voltage VP1 (second voltage: voltage VDD) supplied to the positive power supply terminal P.

At time t65, the signal generation circuit 153A shifts the voltage of the drive signal DRV from the voltage VDD (fifth voltage) to 0 V (first voltage), according to the fall of the input signal IN. At time t65, the NOT circuit INV1 shifts the voltage of the control signal CT1 from 0 V (first voltage) to the voltage VDD (fourth voltage). At time t65, both ends of the short-circuit control element SW1 are short-circuited according to the control signal CT1 in which the voltage is the voltage VDD (fourth voltage). At time t65, the voltage VDD (second voltage) is supplied from the power supply line W_VDD to the positive power supply terminal P of the output control circuit 154 and the other end of the capacitive element Cext1. At time t65, the voltage VP1 is the voltage VDD (second voltage). At time t65, the output control circuit 154 shifts the voltage of the transmission signal OUT from the voltage VDD (second voltage) to 0 V (first voltage) supplied to the negative power supply terminal M, according to the drive signal DRV.

Note that the time period from time t61 to time t62 is typically equal to or smaller than half the time period from time t61 to time t63 and the time period from time t63 to time t64 is typically equal to or smaller than half the time period from time t62 to time t64.

This completes the description of the example of the shift in the voltage of each signal in the transmission driver 152A.

Figure 7:
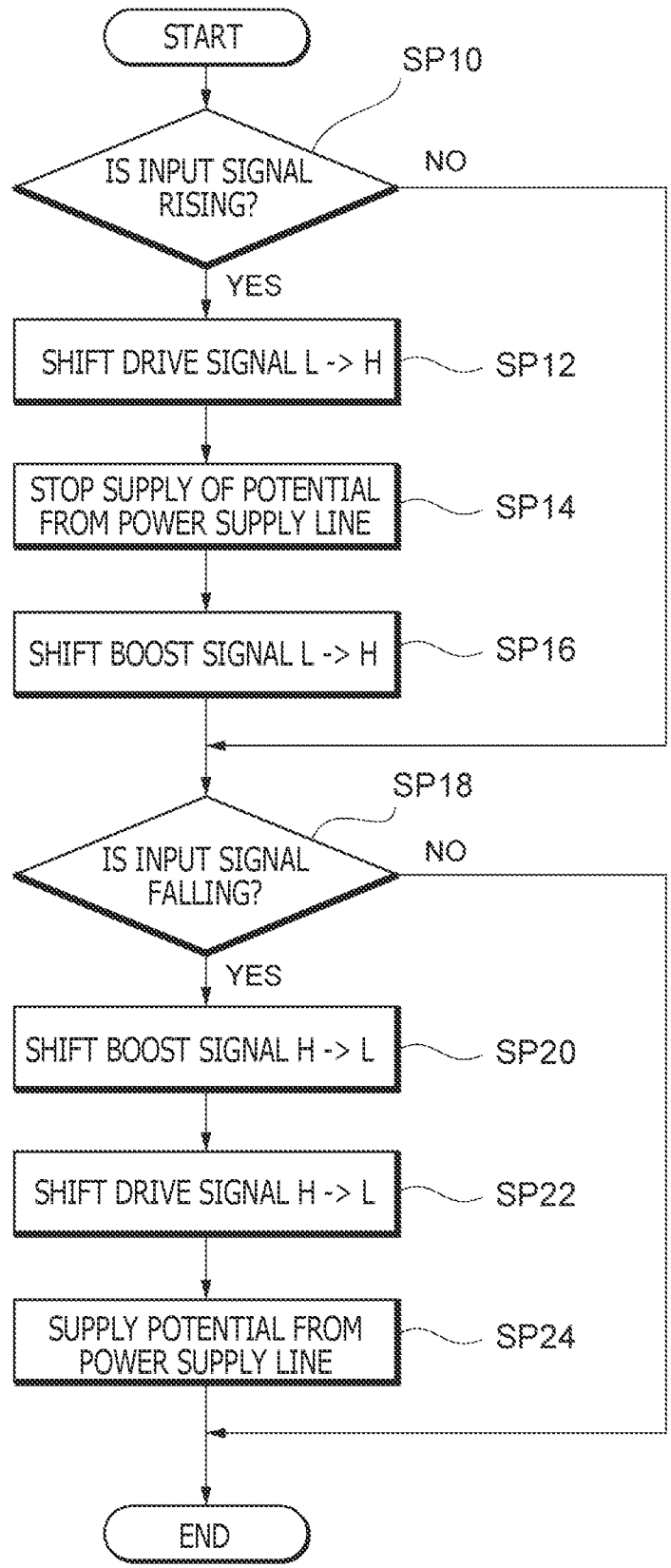
FIG. 7 is a flow chart illustrating an example of a flow of a series of processes of an electronic device including the transmission driver according to the first embodiment.

Next, a flow of a series of processes of an electronic device (stylus 2 or touch sensor mounted apparatus 3) including the transmission driver 152A will be described in detail. FIG. 7 is a flow chart illustrating an example of a flow of a series of processes of the electronic device including the transmission driver 152A according to the first embodiment.
(Step SP10)

In the electronic device, the signal generation circuit 153A of the transmission driver 152A determines whether or not the signal waveform of the input signal IN is rising. If the electronic device determines that the signal waveform of the input signal IN is rising, the process moves to a process of step SP12. On the other hand, if the electronic device determines that the signal waveform of the input signal IN is not rising, the process moves to a process of step SP18.
(Step SP12)

The operation mode of the electronic device is the first mode. In the electronic device in the first mode, the transmission driver 152A transmits the transmission signal OUT with the voltage in a range from 0 V (first voltage) to the voltage VDD (second voltage). The electronic device causes the signal generation circuit 153A to shift the voltage of the drive signal DRV from 0 V (first voltage) to the voltage VDD (fourth voltage) and outputs the drive signal DRV to the output control circuit 154. The electronic device then causes the output control circuit 154 to shift the voltage of the transmission signal OUT from 0 V (first voltage) to the voltage VDD (second voltage). The process then moves to a process of step SP14.
(Step SP14)

The electronic device opens the short-circuit control element SW1 to stop the supply of the voltage VDD (second voltage) from the power supply line W_VDD to the positive power supply terminal P of the output control circuit 154 and the other end of the capacitive element Cext1. The process then moves to a process of step SP16.
(Step SP16)

The electronic device switches the operation mode from the first mode to the second mode. The electronic device causes the signal generation circuit 153A to shift the voltage of the boost signal BST1 from 0 V (first voltage) to the voltage VDD (fifth voltage) and outputs the boost signal BST1 to the buffer circuit BUF1. In association with this, the voltage VP1 of the other end of the capacitive element Cext1 shifts from the voltage VDD (second voltage) to the voltage (third voltage) that is twice the voltage VDD, and the voltage (third voltage) that is twice the voltage VDD is supplied to the positive power supply terminal P of the output control circuit 154. As a result, the electronic device causes the output control circuit 154 to shift the voltage of the transmission signal OUT from the voltage VDD (second voltage) to the voltage (third voltage) that is twice the voltage VDD. The process then moves to a process of step SP18.
(Step SP18)

In the electronic device, the signal generation circuit 153A of the transmission driver 152A determines whether or not the signal waveform of the input signal IN is falling. If the electronic device determines that the signal waveform of the input signal IN is falling, the process moves to a process of step SP20. On the other hand, if the electronic device determines that the signal waveform of the input signal IN is not falling, the process ends the series of processes in FIG. 7.
(Step SP20)

The operation mode of the electronic device is the second mode. In the electronic device in the second mode, the transmission driver 152A transmits the transmission signal OUT with the voltage in a range from 0 V (first voltage) to the voltage (third voltage) higher than the voltage VDD (second voltage). The electronic device then switches the operation mode from the second mode to the first mode. The electronic device causes the signal generation circuit 153A to shift the voltage of the boost signal BST1 from the voltage VDD (fifth voltage) to 0 V (first voltage) and outputs the boost signal BST1 to the buffer circuit BUF1. In association with this, the voltage VP1 of the other end of the capacitive element Cext1 shifts from the voltage (third voltage) that is twice the voltage VDD to the voltage VDD (second voltage), and the voltage VDD (second voltage) is supplied to the positive power supply terminal P of the output control circuit 154. As a result, the electronic device causes the output control circuit 154 to shift the voltage of the transmission signal OUT from the voltage (third voltage) that is twice the voltage VDD to the voltage VDD (second voltage). The process then moves to a process of step SP22.

(Step SP22)

The electronic device causes the signal generation circuit 153A to shift the voltage of the drive signal DRV from the voltage VDD (fourth voltage) to 0 V (first voltage) and outputs the drive signal DRV to the output control circuit 154. The electronic device then causes the output control circuit 154 to shift the voltage of the transmission signal OUT from the voltage VDD (second voltage) to 0 V (first voltage). The process then moves to a process of step SP24.

(Step SP24)

The electronic device short-circuits the short-circuit control element SW1 to supply the voltage VDD (second voltage) from the power supply line W_VDD to the positive power supply terminal P of the output control circuit 154 and the other end of the capacitive element Cext1.

Effects

In the first embodiment, the transmission driver 152A receives the input signal IN, the voltage GND (first voltage), and the voltage VDD (second voltage) and transmits the transmission signal OUT according to the input signal IN. The transmission driver 152A includes the first mode of transmitting the transmission signal OUT with the voltage in the range from the voltage GND (first voltage) to the voltage VDD (second voltage) and the second mode of transmitting the transmission signal OUT with the voltage in the range from the voltage GND (first voltage) to the voltage (third voltage) higher than the voltage VDD (second voltage).

According to the configuration, the transmission driver 152A can output the transmission signal OUT with the voltage (third voltage) higher than the supplied voltage VDD (second voltage), and the voltage of the power supply that supplies the voltage VDD does not have to be higher than the voltage VDD. Thus, the transmission driver 152A can independently reduce the power consumption.

In the first embodiment, the transmission driver 152A further includes the first booster circuit 155 that supplies the voltage (third voltage) higher than the voltage VDD (second voltage).

According to the configuration, the transmission driver 152A can supply the voltage (third voltage) higher than the voltage VDD (second voltage) supplied by the first booster circuit 155, and the voltage of the power supply that supplies the voltage VDD does not have to be higher than the voltage VDD. Thus, the transmission driver 152A can independently reduce the power consumption.

In the first embodiment, the transmission driver 152A further includes the output control circuit 154 that receives the voltage GND (first voltage) and one of the voltage VDD (second voltage) and the voltage (third voltage) higher than the voltage VDD and that outputs the transmission signal OUT from the output terminal O, and the short-circuit control element SW1 that controls the supply of the voltage VDD (second voltage) to the output control circuit 154.

According to the configuration, the short-circuit control element SW1 in the transmission driver 152A can control the supply of voltage to the output control circuit 154. Thus, the transmission driver 152A can independently reduce the power consumption with a simple configuration.

In the first embodiment, the first booster circuit 155 includes the capacitive element Cext1.

According to the configuration, the capacitive element Cext1 in the transmission driver 152A realizes boosting. Thus, the transmission driver 152A can independently reduce the power consumption with a simple configuration.

In the transmission driver 152A of the first embodiment, the voltage VDD (second voltage) is supplied to the output control circuit 154 through the short-circuit control element SW1 in the first mode. In the second mode, the short-circuit control element SW1 cuts off the supply of the voltage VDD (second voltage) to the output control circuit 154, and the first booster circuit 155 supplies the voltage (third voltage) higher than the voltage VDD to the output control circuit 154.

According to the configuration, the short-circuit control element SW1 in the transmission driver 152A can control the supply of voltage to the output control circuit 154. Thus, the transmission driver 152A can independently reduce the power consumption with a simple configuration.

In the first embodiment, the output control circuit 154 includes the positive power supply terminal P and the negative power supply terminal M, the voltage GND (first voltage) is supplied to the negative power supply terminal M, the voltage VDD (second voltage) is supplied to one end of the short-circuit control element SW1, and the other end of the short-circuit control element SW1 and one end of the capacitive element Cext1 are connected to the positive power supply terminal P.

According to the configuration, the capacitive element Cext1 in the transmission driver 152A realizes boosting. Thus, the transmission driver 152A can independently reduce the power consumption with a simple configuration.

In the first embodiment, the transmission driver 152A further includes the signal generation circuit 153A that generates the drive signal DRV (first signal) and the boost signal BST1 (second signal) according to the input signal IN. The output control circuit 154 sets the voltage supplied to the positive power supply terminal P or the voltage (first voltage) supplied to the negative power supply terminal M, as the transmission signal OUT, according to the drive signal DRV (first signal), and outputs the transmission signal OUT. The boost signal BST1 (second signal) is input to the other end of the capacitive element Cext1.

According to the configuration, the voltage of one end of the capacitive element Cext1 in the transmission driver 152A is determined by the voltage of the boost signal BST1. When both ends of the short-circuit control element SW1 are open, the capacitive element Cext1 tries to maintain the voltage difference between the two ends. Hence, the voltage VP1 of the other end of the capacitive element Cext1 is determined by the voltage of one end of the capacitive element Cext1. That is, if the voltage of one end of the capacitive element Cext1 is raised when the voltage VP1 of the other end of the capacitive element Cext1 is the voltage VDD, the voltage VP1 of the other end of the capacitive element Cext1 exceeds the voltage VDD. As a result, the transmission driver 152A can output, as the transmission signal OUT, the voltage exceeding the voltage VDD of the power supply line W_VDD from the output control circuit 154, and the voltage of the power supply line W_VDD can be suppressed. Thus, the transmission driver 152A independently realizes the reduction in power consumption.

In the first embodiment, the transmission driver 152A further includes the NOT circuit INV1 (control circuit) that controls the short-circuit control element SW1 to short-circuit the short-circuit control element SW1 when the voltage of the drive signal DRV (first signal) is the voltage GND (first voltage) and to open the short-circuit control element SW1 when the voltage of the drive signal DRV (first signal) is the voltage VDD (fourth voltage). The signal generation circuit 153A generates the drive signal DRV (first signal) such that the voltage is shifted from the voltage GND (first voltage) to the voltage VDD (fourth voltage) at the first timing (time t61) corresponding to the rise of the input signal IN and that the voltage is shifted from the voltage VDD (fourth voltage) to the voltage GND (first voltage) at the fourth timing (time t65) that is a timing at which a predetermined time period has passed from the third timing (time t64) corresponding to the fall of the input signal IN. The signal generation circuit 153A generates the boost signal BST1 (second signal) such that the voltage is shifted from the voltage GND (first voltage) to the voltage VDD (fifth voltage) at the second timing (time t62) that is a timing at which a predetermined time period has passed from the first timing (time t61) and that the voltage is shifted from the voltage VDD (fifth voltage) to the voltage GND (first voltage) at the third timing (time t64).

According to the configuration, the transmission driver 152A supplies 0 V to one end of the capacitive element Cext1 and supplies the voltage VDD from the power supply line W_VDD to the other end of the capacitive element Cext1. The transmission driver 152A then stops the supply of the voltage VDD from the power supply line W_VDD to the other end of the capacitive element Cext1. The transmission driver 152A further raises the voltage of one end of the capacitive element Cext1 from 0 V to the voltage VDD to increase the voltage VP1 of the other end of the capacitive element Cext1 to the voltage twice the voltage VDD and supplies the increased voltage VP1 to the positive power supply terminal P of the output control circuit 154. In this way, the transmission driver 152A can output, as the transmission signal OUT, the voltage twice the voltage VDD of the power supply line W_VDD from the output control circuit 154, and the voltage of the power supply line W_VDD can be suppressed. Thus, the transmission driver 152A independently realizes the reduction in power consumption.

In the first embodiment, the time period from the first timing (time t61) to the second timing (time t62) is equal to or smaller than half the time period from the first timing (time t61) to the third timing (time t63). The time period from the third timing (time t63) to the fourth timing (time t64) is equal to or smaller than half the time period from the second timing (time t62) to the fourth timing (time t64).

In the first embodiment, the fourth voltage and the fifth voltage are equal to the voltage VDD (second voltage) of the power supply line W_VDD.

According to the configuration, the transmission driver 152A can output the transmission signal OUT with the voltage exceeding the voltage VDD of the power supply line W_VDD, even when the power supply system is one. Thus, the transmission driver 152A independently realizes the reduction in power consumption.

In the first embodiment, the capacitance of the capacitive element Cext1 is equal to or greater than ten times the parasitic capacitance Cout connected to the output terminal O. Specifically, while the capacitance of the parasitic capacitance Cout is smaller than 10 pF, the capacitance of the capacitive element Cext1 is 1 to 10 uF.

In the first embodiment, the electronic device (stylus 2 or touch sensor mounted apparatus 3) includes the electrode 20 or the linear electrode 32 that transmits and receives signals, and the transmission driver 152A that receives the input signal IN, the voltage GND (first voltage), and the voltage VDD (second voltage) and that transmits the transmission signal OUT according to the input signal IN. In the electronic device, the transmission driver 152A includes the first mode of transmitting the transmission signal OUT with the voltage ranging from the voltage GND (first voltage) to the voltage VDD (second voltage) and the second mode of transmitting the transmission signal OUT with the voltage ranging from the voltage GND (first voltage) to the voltage (third voltage) higher than the voltage VDD (second voltage).

According to the configuration, the electronic device (stylus 2 or touch sensor mounted apparatus 3) provided with the transmission driver 152A can reduce the power consumption.

In the first embodiment, the transmission driver 152A is mounted on the stylus 2. The electrode 20 is a stylus side electrode that transmits and receives signals through capacitive coupling between the electrode 20 and the sensor side electrode connected to the sensor controller 10, and the electrode 20 is mounted on the stylus 2.

According to the configuration, the stylus 2 can reduce the power consumption.

In the first embodiment, the electronic device (touch sensor mounted apparatus 3) includes the touch sensor 30 including the plurality of linear electrodes 32 arranged in a plane shape, and the sensor controller 10 that includes the plurality of transmission drivers 152A configured to transmit the transmission signals OUT to the corresponding linear electrodes 32 and that is connected to the touch sensor 30.

According to the configuration, the touch sensor mounted apparatus 3 can reduce the power consumption.

Second Embodiment

This completes the description of the first embodiment. Next, a second embodiment will be described.

Circuit Configuration

Figure 8:
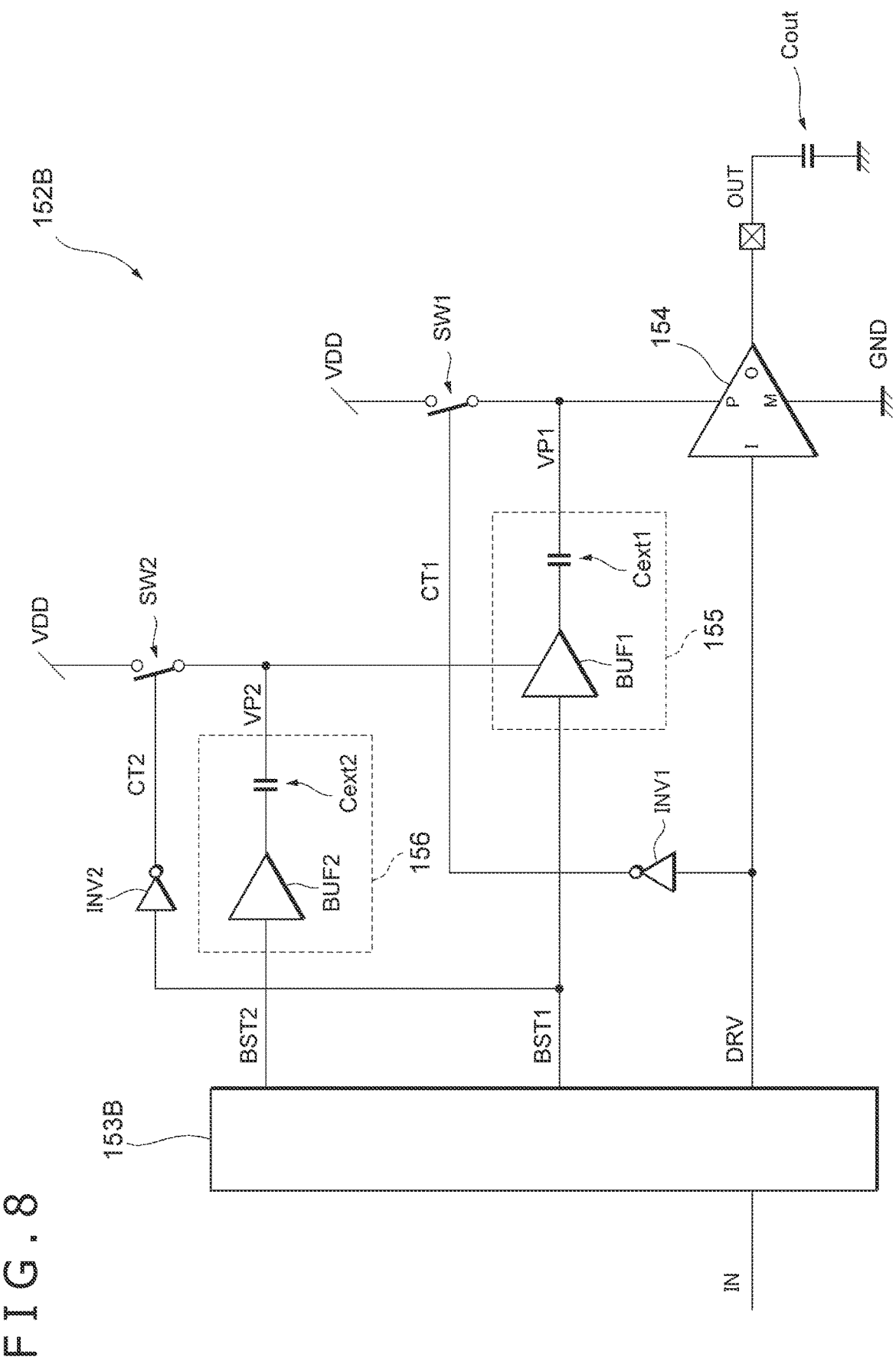
FIG. 8 depicts an example of a transmission driver according to a second embodiment.

FIG. 8 depicts an example of a circuit configuration of a transmission driver 152B according to the second embodiment. As illustrated in FIG. 8, the transmission driver 152B further includes, for example, a second booster circuit 156 and a NOT circuit INV2, as compared to the transmission driver 152A. The transmission driver 152B includes a signal generation circuit 153B in place of the signal generation circuit 153A, as compared to the transmission driver 152A. Note that, in the description of the circuit configuration of the transmission driver 152B, the description of components similar to the components of the transmission driver 152A will appropriately be skipped.

The signal generation circuit 153B generates the drive signal DRV and boost signals BST1 and BST2 according to the input signal IN that is input. The signal generation circuit 153B outputs the generated drive signal DRV to the NOT circuit INV1 and the output control circuit 154, outputs the generated boost signal BST1 to the NOT circuit INV2 and the buffer circuit BUF1 of the first booster circuit 155, and outputs the generated boost signal BST2 to the buffer circuit BUF2 of the second booster circuit 156.

Specifically, the signal generation circuit 153B generates the drive signal DRV such that the voltage is shifted from the low level (first voltage) to the high level (fourth voltage) at the first timing and that the voltage is shifted from the high level (fourth voltage) to the low level (first voltage) at the fourth timing. The signal generation circuit 153B generates the boost signal BST1 such that the voltage is shifted from the low level (first voltage) to the high level (fifth voltage) at the second timing and that the voltage is shifted from the high level (fifth voltage) to the low level (first voltage) at the third timing.

The signal generation circuit 153B generates the boost signal BST2 such that the voltage is shifted from the low level to the high level at a fifth timing that is a timing in a period from the second timing to the third timing and that the voltage is shifted from the high level to the low level at a sixth timing that is a timing in a period from the fifth timing to the third timing.

The NOT circuit INV2 is, for example, an inverter circuit including a transistor, and functions as a control circuit that uses a control signal CT2 to control a short-circuit control element SW2. The NOT circuit INV2 performs a NOT operation of the boost signal BST1 input from the signal generation circuit 153B, sets the signal that has been subjected to the operation, as the control signal CT2, and outputs the control signal CT2 to a control terminal of the short-circuit control element SW2.

The second booster circuit 156 includes, for example, a buffer circuit BUF2 and a capacitive element Cext2. The second booster circuit 156 supplies, to the first booster circuit 155, voltage (seventh voltage) higher than 0 V (first voltage) by a difference between the voltage (third voltage) that is twice the voltage VDD and the voltage VDD (second voltage) or voltage (eighth voltage) higher than 0 V (first voltage) by a difference between voltage (sixth voltage) that is three times the voltage VDD and the voltage VDD (second voltage). Specifically, when the voltage of the boost signal BST2 output from the signal generation circuit 153B is in the high level, the second booster circuit 156 boosts the voltage of a node connected to the output side and supplies the boosted voltage (eighth voltage) to a power supply terminal of the buffer circuit BUF1 in the first booster circuit 155. On the other hand, when the voltage of the boost signal BST2 is in the low level, the second booster circuit 156 stops the boost and supplies the voltage (seventh voltage) that has not been boosted to the power supply terminal of the buffer circuit BUF1 in the first booster circuit 155.

The buffer circuit BUF2 is, for example, a buffer circuit including a MOS transistor. The buffer circuit BUF2 enhances the boost signal BST2 output from the signal generation circuit 153B and outputs the enhanced boost signal BST2 to the capacitive element Cext2. The buffer circuit BUF2 reduces or eliminates the electrical effect that the capacitive element Cext2 and the signal generation circuit 153B exert on each other. Although the buffer circuit BUF2 is provided on the transmission driver 152B in the second embodiment, the buffer circuit BUF2 may not be provided, and the boost signal BST2 may directly be input from the signal generation circuit 153B to one end of the capacitive element Cext2.

One end of the capacitive element Cext2 is connected to an output terminal of the buffer circuit BUF2, and the other end of the capacitive element Cext2 is connected to the other end of the short-circuit control element SW2 and the power supply terminal of the buffer circuit BUF1 in the first booster circuit 155. The capacitive element Cext2 supplies the voltage VP2 (seventh voltage or eighth voltage) to the power supply terminal of the buffer circuit BUF1 in the first booster circuit 155. The capacitive element Cext2 receives the voltage VDD from the power supply line W_VDD when the short-circuit control element SW2 is short-circuited. The capacitance of the capacitive element Cext2 is, for example, 1 to 10 uF and is typically 1 uF.

The short-circuit control element SW2 is, for example, a switch element or a transistor. One end of the short-circuit control element SW2 is connected to the power supply line W_VDD, and the other end of the short-circuit control element SW2 is connected to the other end of the capacitive element Cext2 and the power supply terminal of the buffer circuit BUF1 in the first booster circuit 155. The short-circuit control element SW2 short-circuits or opens both ends according to the control signal CT2 input to the control terminal. Specifically, when the state of the control signal CT2 is the high state, the short-circuit control element SW2 short-circuits both ends and supplies the voltage VDD (seventh voltage) of the power supply line W_VDD to the power supply terminal of the buffer circuit BUF1 in the first booster circuit 155 and the capacitive element Cext2. On the other hand, when the state of the control signal CT2 is the low state, the short-circuit control element SW2 opens both ends and stops the supply of the voltage VDD of the power supply line W_VDD.

In the transmission driver 152B configured in this way, the short-circuit control element SW1 short-circuits both ends when the state of the drive signal DRV corresponding to the input signal IN is the low state and opens both ends when the state of the drive signal DRV is the high state. While the short-circuit control element SW1 is short-circuited, the operation mode of the transmission driver 152B is the first mode. The voltage VDD (second voltage) is supplied from the power supply line W_VDD to the positive power supply terminal P of the output control circuit 154 and the other end of the capacitive element Cext1, and the voltage GND (first voltage) is supplied to one end of the capacitive element Cext1.

While the short-circuit control element SW1 is open but the short-circuit control element SW2 is short-circuited, the operation mode of the transmission driver 152B is the second mode. The short-circuit control element SW1 cuts off the supply of the voltage VDD to the output control circuit 154, and the voltage VP1 is supplied from the other end of the capacitive element Cext1 to the positive power supply terminal P of the output control circuit 154. While the short-circuit control element SW1 is open but the short-circuit control element SW2 is short-circuited, the voltage VP1 is voltage equivalent to the sum of the voltage VDD and the voltage of one end of the capacitive element Cext1 determined by the boost signal BST1 corresponding to the input signal IN. Specifically, the voltage VP1 is the voltage VDD (second voltage) when the voltage of one end of the capacitive element Cext1 is the voltage GND, and the voltage VP1 is the voltage (third voltage) that is twice the voltage VDD, when the voltage of one end of the capacitive element Cext1 is the voltage VDD.

While both the short-circuit control elements SW1 and SW2 are open, the operation mode of the transmission driver 152B is the third mode. The short-circuit control element SW1 cuts off the supply of the voltage VDD to the output control circuit 154, and the voltage VP1 is supplied from the other end of the capacitive element Cext1 to the positive power supply terminal P of the output control circuit 154. The short-circuit control element SW2 cuts off the supply of the voltage VDD (seventh voltage) to the power supply terminal of the buffer circuit BUF1 in the first booster circuit 155, and the voltage VP2 (seventh voltage) is supplied from the other end of the capacitive element Cext2 to the power supply terminal of the buffer circuit BUF1 in the first booster circuit 155.

While both the short-circuit control elements SW1 and SW2 are open, the voltage VP2 is voltage equivalent to the sum of the voltage VDD and the voltage of one end of the capacitive element Cext2 determined by the boost signal BST2 corresponding to the input signal IN. Specifically, the voltage VP2 is the voltage VDD (seventh voltage) when the voltage of one end of the capacitive element Cext2 is the voltage GND, and the voltage VP2 is the voltage (eighth voltage) that is twice the voltage VDD, when the voltage of one end of the capacitive element Cext2 is the voltage VDD.

While both the short-circuit control elements SW1 and SW2 are open, the voltage VP1 is voltage equivalent to the sum of the voltage VDD and the voltage of one end of the capacitive element Cext1 determined by the boost signals BST1 and BST2 corresponding to the input signal IN. Specifically, the voltage VP1 is the voltage VDD (second voltage) when the voltage of one end of the capacitive element Cext1 is the voltage GND. On the other hand, the voltage VP1 is voltage equivalent to the sum of the voltage VP2 and the voltage VDD, that is, the voltage (third voltage) that is twice the voltage VDD or the voltage (sixth voltage) that is three times the voltage VDD, when the voltage of one end of the capacitive element Cext1 is the voltage VP2 (potential VDD or voltage twice the voltage VDD).

The transmission driver 152B sets, as the transmission signal OUT, the voltage supplied to the positive power supply terminal P of the output control circuit 154 or the voltage supplied to the negative power supply terminal M of the output control circuit 154, according to the state of the input signal IN, and transmits the transmission signal OUT to the electrode 20 or the linear electrode 32. That is, the transmission driver 152B generates the transmission signal OUT in which the voltage shifts to the voltage VDD (second voltage), the voltage (third voltage) that is twice the voltage VDD, the voltage (sixth voltage) that is three times the voltage VDD, and the voltage GND (first voltage), according to the input signal IN, and transmits the transmission signal OUT to the electrode 20 or the linear electrode 32.

Flow of a Series of Operations Regarding Transmission Driver

Figure 9:
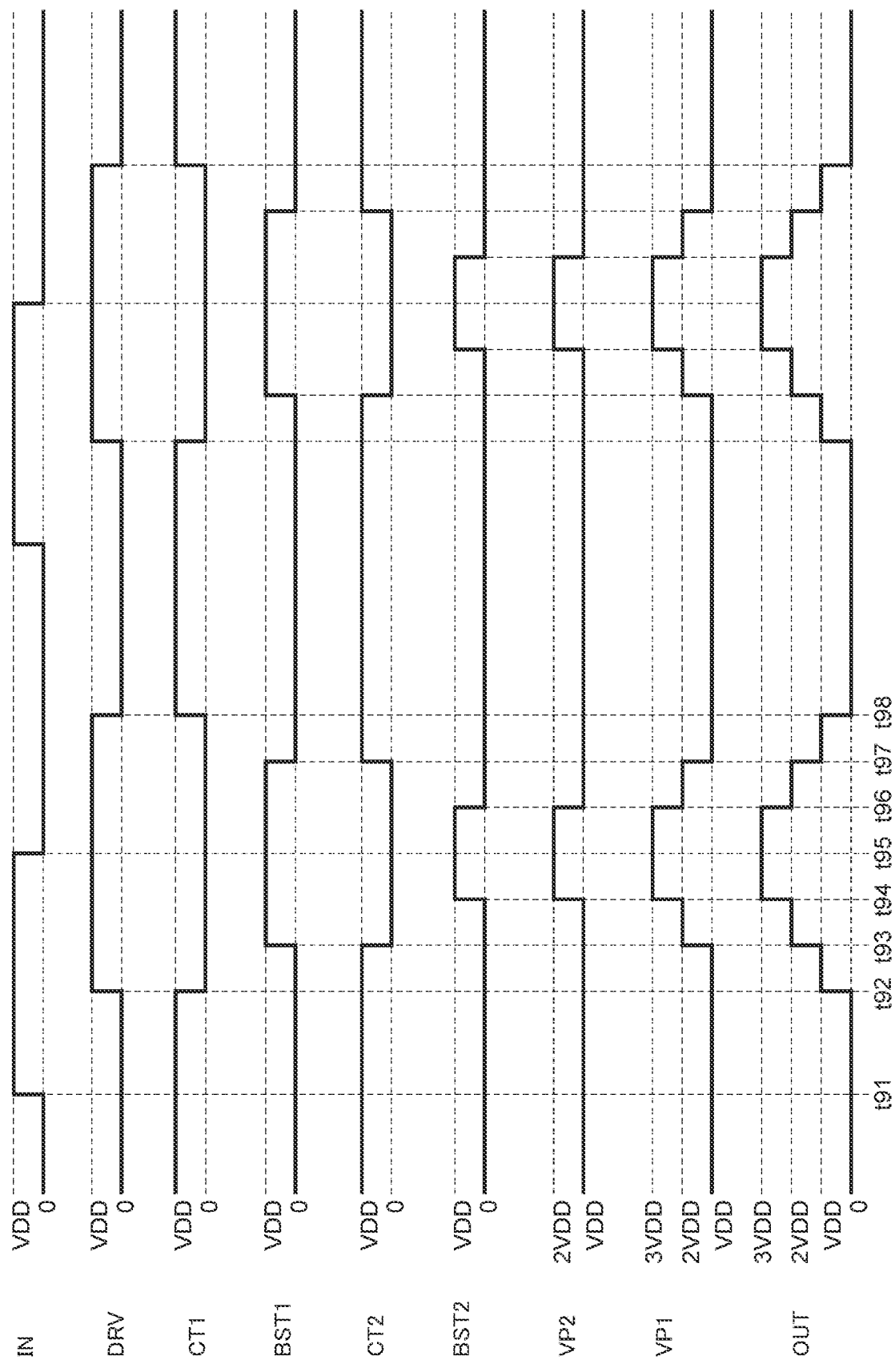
FIG. 9 is a timing chart illustrating an example of a shift in voltage of each signal in the transmission driver according to the second embodiment.

This completes the description of the configuration of the transmission driver 152B. Next, the shift in the voltage of each signal in the transmission driver 152B will be described in detail. FIG. 9 is a timing chart illustrating an example of the shift in the voltage of each signal in the transmission driver 152B according to the second embodiment.

At time t91, the operation mode of the transmission driver 152B is the first mode. At time t91, the driver selection circuit 151 or the controller 28 shifts the voltage of the input signal IN from 0 V to the voltage VDD. At time t91, the signal generation circuit 153B detects a rise in the voltage of the input signal IN. At time t91, the short-circuit control element SW1 is short-circuited, and the voltage VDD is supplied from the power supply line W_VDD to the positive power supply terminal P of the output control circuit 154 and the other end of the capacitive element Cext1. At time t91, the short-circuit control element SW2 is short-circuited, and the voltage VDD is supplied from the power supply line W_VDD to the power supply terminal of the buffer circuit BUF1 in the first booster circuit 155 and the other end of the capacitive element Cext2. At time t91, the signal generation circuit 153B sets the voltage of the boost signal BST1 to 0 V and outputs the boost signal BST1 to the buffer circuit BUF1. Accordingly, the voltage of the voltage VP1 is the voltage VDD (second voltage) at time t91. The voltage of the voltage VP2 is the voltage VDD (seventh voltage) at time t91. As a result, at time t91, the output control circuit 154 sets the voltage of the transmission signal OUT to 0 V (first voltage) and transmits the transmission signal OUT to the electrode 20 or the linear electrode 32.

At time t92, the signal generation circuit 153B shifts the voltage of the drive signal DRV from 0 V to the voltage VDD according to a rise of the input signal IN. At time t92, the NOT circuit INV1 shifts the voltage of the control signal CT1 from the voltage VDD to 0 V. At time t92, both ends of the short-circuit control element SW1 are opened according to the control signal CT1 in which the voltage is 0 V. At time t92, the supply of the voltage VDD (second voltage) from the power supply line W_VDD to the positive power supply terminal P of the output control circuit 154 and the other end of the capacitive element Cext1 stops. Accordingly, the voltage of the voltage VP1 is the voltage VDD (second voltage) at time t92. The voltage of the voltage VP2 is the voltage VDD (seventh voltage) at time t92. At time t92, the output control circuit 154 shifts the voltage of the transmission signal OUT from 0 V (first voltage) to the voltage VDD (second voltage) supplied to the positive power supply terminal P, according to the drive signal DRV.

At time t93, the operation mode of the transmission driver 152B is switched from the first mode to the second mode. At time t93, the signal generation circuit 153B shifts the voltage of the boost signal BST1 from 0 V to the voltage VDD. At time t93, the NOT circuit INV2 shifts the voltage of the control signal CT2 from the voltage VDD to 0 V. At time t93, both ends of the short-circuit control element SW2 are opened according to the control signal CT2 in which the voltage is 0 V. At time t93, the supply of the voltage VDD (second voltage) from the power supply line W_VDD to the power supply terminal of the buffer circuit BUF1 in the first booster circuit 155 and the other end of the capacitive element Cext2 stops. At time t93, the voltage of the voltage VP2 is the voltage VDD (seventh voltage). At time t93, the buffer circuit BUF1 shifts the voltage of one end of the capacitive element Cext1 from 0 V to the voltage VDD. In association with this, the capacitive element Cext1 tries to hold the voltage difference between the two ends, and the voltage VP1 of the other end of the capacitive element Cext1 shifts at time t93 from the voltage VDD (second voltage) to the voltage (third voltage: 2×voltage VDD) equivalent to the sum of the voltage VDD and the voltage (potential VDD) of one end of the capacitive element Cext1. As a result, at time t93, the output control circuit 154 shifts the voltage of the transmission signal OUT from the voltage VDD (second voltage) to the voltage (third voltage) that is twice the voltage VDD.

At time t94, the operation mode of the transmission driver 152B is switched from the second mode to the third mode. At time t94, the signal generation circuit 153B shifts the voltage of the boost signal BST2 from 0 V to the voltage VDD. At time t94, the buffer circuit BUF2 shifts the voltage of one end of the capacitive element Cext2 from 0 V to the voltage VDD. In association with this, the capacitive element Cext2 tries to hold the voltage difference between the two ends, and the voltage VP2 of the other end of the capacitive element Cext2 shifts at time t94 from the voltage VDD (seventh voltage) to the voltage (eighth voltage: 2×voltage VDD) equivalent to the sum of the voltage VDD and the voltage (potential VDD) of one end of the capacitive element Cext2. At time t94, the buffer circuit BUF1 shifts the voltage of one end of the capacitive element Cext1 from the voltage VDD (seventh voltage) to the voltage (eighth voltage: 2×voltage VDD) equivalent to the sum of the voltage VDD and the voltage (potential VDD) of one end of the capacitive element Cext2. In association with this, the capacitive element Cext1 tries to hold the voltage difference between the two ends, and the voltage VP1 of the other end of the capacitive element Cext1 shifts at time t94 from the third voltage (2×voltage VDD) to the voltage (sixth voltage: 3×voltage VDD) equivalent to the sum of the voltage VDD and the voltage (2×voltage VDD) of one end of the capacitive element Cext1. As a result, the output control circuit 154 shifts the voltage of the transmission signal OUT from the voltage (third voltage) that is twice the voltage VDD to the voltage (sixth voltage) that is three times the voltage VDD.

At time t95, the driver selection circuit 151 or the controller 28 shifts the voltage of the input signal IN from the voltage VDD to 0 V. At time t95, the signal generation circuit 153B detects a fall in the voltage of the input signal IN. At time t95, the output control circuit 154 keeps the voltage of the transmission signal OUT set to the voltage (sixth voltage) that is three times the voltage VDD and transmits the transmission signal OUT to the electrode 20 or the linear electrode 32.

At time t96, the operation mode of the transmission driver 152B is switched from the third mode to the second mode. At time t96, the signal generation circuit 153B shifts the voltage of the boost signal BST2 from the voltage VDD to 0 V. At time t96, the buffer circuit BUF2 shifts the voltage of one end of the capacitive element Cext2 from the voltage VDD to 0 V. In association with this, the capacitive element Cext2 tries to hold the voltage difference between the two ends, and the voltage VP2 of the other end of the capacitive element Cext2 shifts at time t96 from the voltage (eighth voltage) that is twice the voltage VDD to the voltage VDD (seventh voltage). At time t96, the buffer circuit BUF1 shifts the voltage of one end of the capacitive element Cext1 from the voltage (eighth voltage) that is twice the voltage VDD to the voltage VDD (seventh voltage). In association with this, the capacitive element Cext1 tries to hold the voltage difference between the two ends, and the voltage VP1 of the other end of the capacitive element Cext1 shifts at time t96 from the voltage (sixth voltage) that is three times the voltage VDD to the voltage (third voltage) that is twice the voltage VDD. As a result, at time t96, the output control circuit 154 shifts the voltage of the transmission signal OUT from the voltage (sixth voltage) that is three times the voltage VDD to the voltage (third voltage) that is twice the voltage VDD.

At time t97, the operation mode of the transmission driver 152B is switched from the second mode to the first mode. At time t97, the signal generation circuit 153B shifts the voltage of the boost signal BST1 from the voltage VDD to 0 V. At time t97, the NOT circuit INV2 shifts the voltage of the control signal CT2 from 0 V to the voltage VDD. At time t97, both ends of the short-circuit control element SW2 are short-circuited according to the control signal CT2 in which the voltage is the voltage VDD. At time t97, the voltage VDD is supplied from the power supply line W_VDD to the power supply terminal of the buffer circuit BUF1 in the first booster circuit 155 and the other end of the capacitive element Cext2. At time t97, the buffer circuit BUF1 shifts the voltage of one end of the capacitive element Cext1 from the voltage VDD to 0 V. In association with this, the capacitive element Cext1 tries to hold the voltage difference between the two ends, and the voltage VP1 of the other end of the capacitive element Cext1 shifts at time t97 from the voltage (third voltage) that is twice the voltage VDD to the voltage VDD (second voltage). As a result, at time t97, the output control circuit 154 shifts the voltage of the transmission signal OUT from the voltage (third voltage) that is twice the voltage VDD to the voltage VDD (second voltage).

At time t98, the signal generation circuit 153B shifts the voltage of the drive signal DRV from the voltage VDD to 0 V according to a fall of the input signal IN. At time t98, the NOT circuit INV1 shifts the voltage of the control signal CT1 from 0 V to the voltage VDD. At time t98, both ends of the short-circuit control element SW1 are short-circuited according to the control signal CT1 in which the voltage is the voltage VDD. At time t98, the voltage VDD (second voltage) is supplied from the power supply line W_VDD to the positive power supply terminal P of the output control circuit 154 and the other end of the capacitive element Cext1. At time t98, the voltage VP1 is the voltage VDD (second voltage). At time t98, the output control circuit 154 shifts the voltage of the transmission signal OUT from the voltage VDD (second voltage) to 0 V (first voltage) supplied to the negative power supply terminal M, according to the drive signal DRV.

Note that the time period from time t92 to time t93 is, for example, equal to or smaller than ⅓ the time period from time t92 to time t95. The time period from time t93 to time t94 is, for example, equal to or smaller than ⅓ the time period from time t92 to time t95. The time period from time t95 to time t96 is, for example, equal to or smaller than ⅓ the time period from time t95 to time t98. The time period from time t96 to time t97 is, for example, equal to or smaller than ⅓ the time period from time t95 to time t98.

Figure 10:
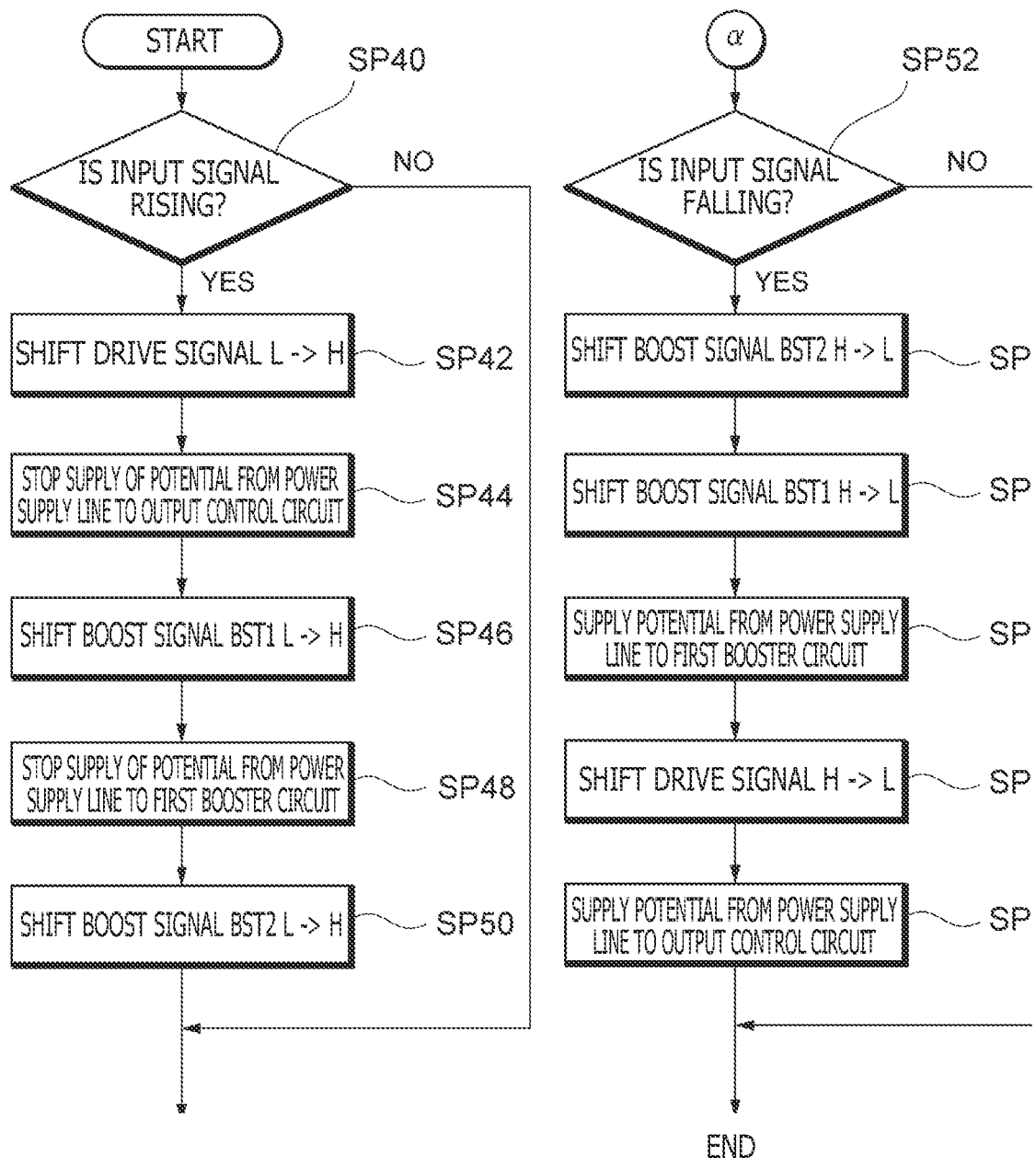
FIG. 10 is a flow chart illustrating an example of a flow of a series of processes of an electronic device including the transmission driver according to the second embodiment.

This completes the description of the example of the shift in the voltage of each signal in the transmission driver 152B. Next, a flow of a series of processes of an electronic device (stylus 2 or touch sensor mounted apparatus 3) including the transmission driver 152B will be described in detail. FIG. 10 is a flow chart illustrating an example of a flow of a series of processes of the electronic device including the transmission driver 152B according to the second embodiment.

(Step SP40)

In the electronic device, the signal generation circuit 153B of the transmission driver 152B determines whether or not the signal waveform of the input signal IN is rising. If the electronic device determines that the signal waveform of the input signal IN is rising, the process moves to a process of step SP42. On the other hand, if the electronic device determines that the signal waveform of the input signal IN is not rising, the process moves to a process of step SP52.

(Step SP42)

The operation mode of the electronic device is the first mode. The electronic device causes the signal generation circuit 153B to shift the voltage of the drive signal DRV from 0 V to the voltage VDD and outputs the drive signal DRV to the output control circuit 154. The electronic device then causes the output control circuit 154 to shift the voltage of the transmission signal OUT from 0 V (first voltage) to the voltage VDD (second voltage). The process then moves to a process of step SP44.

(Step SP44)

The electronic device opens the short-circuit control element SW1 to stop the supply of the voltage VDD (second voltage) from the power supply line W_VDD to the positive power supply terminal P of the output control circuit 154 and the other end of the capacitive element Cext1. The process then moves to a process of step SP46.

(Step SP46)

The electronic device switches the operation mode from the first mode to the second mode. The electronic device causes the signal generation circuit 153B to shift the voltage of the boost signal BST1 from 0 V to the voltage VDD and outputs the boost signal BST1 to the buffer circuit BUF1. Accordingly, the voltage VP1 of the other end of the capacitive element Cext1 shifts from the voltage VDD (second voltage) to the voltage (third voltage) that is twice the voltage VDD, and the voltage (third voltage) that is twice the voltage VDD is supplied to the positive power supply terminal P of the output control circuit 154. As a result, the electronic device causes the output control circuit 154 to shift the voltage of the transmission signal OUT from the voltage VDD (second voltage) to the voltage (third voltage) that is twice the voltage VDD. The process then moves to a process of step SP48.

(Step SP48)

The electronic device opens the short-circuit control element SW2 to stop the supply of the voltage VDD from the power supply line W_VDD to the power supply terminal of the buffer circuit BUF1 in the first booster circuit 155 and the other end of the capacitive element Cext2. The process then moves to a process of step SP50.

(Step SP50)

The electronic device switches the operation mode from the second mode to the third mode. In the electronic device in the third mode, the transmission driver 152B transmits the transmission signal OUT with the voltage in a range from 0 V (first voltage) to the voltage (sixth voltage) higher than the voltage (third voltage) that is higher than the voltage VDD (second voltage). The electronic device causes the signal generation circuit 153B to shift the voltage of the boost signal BST2 from 0 V to the voltage VDD and outputs the boost signal BST2 to the buffer circuit BUF2. Accordingly, the voltage VP2 of the other end of the capacitive element Cext2 shifts from the voltage VDD (seventh voltage) to the voltage (eighth voltage) that is twice the voltage VDD, and the voltage (eighth voltage) that is twice the voltage VDD is supplied to the power supply terminal of the buffer circuit BUF1 in the first booster circuit 155. The voltage VP1 of the other end of the capacitive element Cext1 shifts from the voltage (third voltage) that is twice the voltage VDD to the voltage (sixth voltage) that is three times the voltage VDD, and the voltage (sixth voltage) that is three times the voltage VDD is supplied to the positive power supply terminal P in the output control circuit 154. As a result, the electronic device causes the output control circuit 154 to shift the voltage of the transmission signal OUT from the voltage (third voltage) that is twice the voltage VDD to the voltage (sixth voltage) that is three times the voltage VDD. The process then moves to a process of step SP52.

(Step SP52)

In the electronic device, the signal generation circuit 153B of the transmission driver 152B determines whether or not the signal waveform of the input signal IN is falling. If the electronic device determines that the signal waveform of the input signal IN is falling, the process moves to a process of step SP54. On the other hand, if the electronic device determines that the signal waveform of the input signal IN is not falling, the process ends the series of processes in FIG. 10.

(Step SP54)

The electronic device switches the operation mode from the third mode to the second mode. The electronic device causes the signal generation circuit 153B to shift the voltage of the boost signal BST2 from the voltage VDD to 0 V and outputs the boost signal BST2 to the buffer circuit BUF2. Accordingly, the voltage VP2 of the other end of the capacitive element Cext2 shifts from the voltage (eighth voltage) that is twice the voltage VDD to the voltage VDD (seventh voltage), and the voltage VDD (seventh voltage) is supplied to the power supply terminal of the buffer circuit BUF1 in the first booster circuit 155. The voltage VP1 of the other end of the capacitive element Cext1 shifts from the voltage (sixth voltage) that is three times the voltage VDD to the voltage (third voltage) that is twice the voltage VDD, and the voltage (third voltage) that is twice the voltage VDD is supplied to the positive power supply terminal P of the output control circuit 154. As a result, the electronic device causes the output control circuit 154 to shift the voltage of the transmission signal OUT from the voltage (sixth voltage) that is three times the voltage VDD to the voltage (third voltage) that is twice the voltage VDD. The process then moves to a process of step SP56.

(Step SP56)

The electronic device switches the operation mode from the second mode to the first mode. The electronic device causes the signal generation circuit 153B to shift the voltage of the boost signal BST1 from the voltage VDD to 0 V and outputs the boost signal BST1 to the buffer circuit BUF1. Accordingly, the voltage VP1 of the other end of the capacitive element Cext1 shifts from the voltage (third voltage) that is twice the voltage VDD to the voltage VDD (second voltage), and the voltage VDD (second voltage) is supplied to the positive power supply terminal P of the output control circuit 154. As a result, the electronic device causes the output control circuit 154 to shift the voltage of the transmission signal OUT from the voltage (third voltage) that is twice the voltage VDD to the voltage VDD (second voltage). The process then moves to a process of step SP58.

(Step SP58)

The electronic device short-circuits the short-circuit control element SW2 to supply the voltage VDD (seventh voltage) from the power supply line W_VDD to the power supply terminal of the buffer circuit BUF1 in the first booster circuit 155 and the other end of the capacitive element Cext2. The process then moves to a process of step SP60.

(Step SP60)

The electronic device causes the signal generation circuit 153B to shift the voltage of the drive signal DRV from the voltage VDD to 0 V and outputs the drive signal DRV to the output control circuit 154. The electronic device then causes the output control circuit 154 to shift the voltage of the transmission signal OUT from the voltage VDD (second voltage) to 0 V (first voltage). The process then moves to a process of step SP62.

(Step SP62)

The electronic device short-circuits the short-circuit control element SW1 to supply the voltage VDD (second voltage) from the power supply line W_VDD to the positive power supply terminal P of the output control circuit 154 and the other end of the capacitive element Cext1.

Although the operation of the transmission driver 152B has been described in the second embodiment by assuming that the capacitive elements Cext1 and Cext2 in the transmission driver 152B have substantially the same capacitance, the configuration is not limited to this. The capacitance of the capacitive element Cext1 and the capacitance of the capacitive element Cext2 may be different in the transmission driver 152B.

The sixth voltage is determined by the division ratio of the combined capacitance of the capacitive elements Cext1 and Cext2 to the capacitance of the parasitic capacitance Cout or determined by the division ratio of the capacitance of the capacitive element Cext1 to the capacitance of the parasitic capacitance Cout. Accordingly, the larger the combined capacitance of the capacitive elements Cext1 and Cext2, the higher the voltage. The power consumption can be reduced more, and this is advantageous. Specifically, the relation between the sixth voltage, the combined capacitance of the capacitive elements Cext1 and Cext2, and the parasitic capacitance Cout is expressed by the following equations 1 to 5. Here, voltage V1 represents the second voltage (potential VDD). Voltage V2 represents the third voltage. voltage V3 represents the sixth voltage. Voltage VA represents a voltage difference between the two ends of the capacitive element Cext1 in the second mode, that is, a voltage difference between the third voltage (potential V2) and the second voltage (potential V1). Voltage VB represents a voltage difference between the two ends of the capacitive element Cext2 in the third mode, that is, a voltage difference (eighth voltage) between the sixth voltage (potential V3) and the second voltage (potential V2).

[Math. 1]
$$V3 = V2 + VB \quad \text{(equation 1)}$$

[Math. 2]
$$V2 = VDD + VA \quad \text{(equation 2)}$$

[Math. 3]
$$VB = \frac{Cext1 \;//\; Cext2}{Cext1 \;//\; Cext2 + Cout} \times VDD \quad \text{(equation 3)}$$

[Math. 4]
$$VA = \frac{Cext1}{Cext1 + Cout} \times VDD \quad \text{(equation 4)}$$

[Math. 5]
$$Cext1 \;//\; Cext2 = \frac{Cext1 \times Cext2}{Cext1 + Cext2} \quad \text{(equation 5)}$$

When the capacitive elements Cext1 and Cext2 are mounted on the transmission driver 152B, the larger the capacitance of the capacitive elements Cext1 and Cext2, the larger the area of the capacitive elements Cext1 and Cext2 on the transmission driver 152B. There is often an upper limit to the area of the capacitive elements Cext1 and Cext2 on the transmission driver 152B. Accordingly, there are combinations of the capacitance of the capacitive element Cext1 and the capacitance of the Cext2 that maximize the sixth voltage, based on the area of the capacitive elements Cext1 and Cext2 when the capacitive elements Cext1 and Cext2 are mounted on the transmission driver 152B. The relation between the combinations of the capacitance of the capacitive element Cext1 and the capacitance of the capacitive element Cext2 and the sixth voltage will be described with reference to FIGS. 14 and 15.

Figure 15:
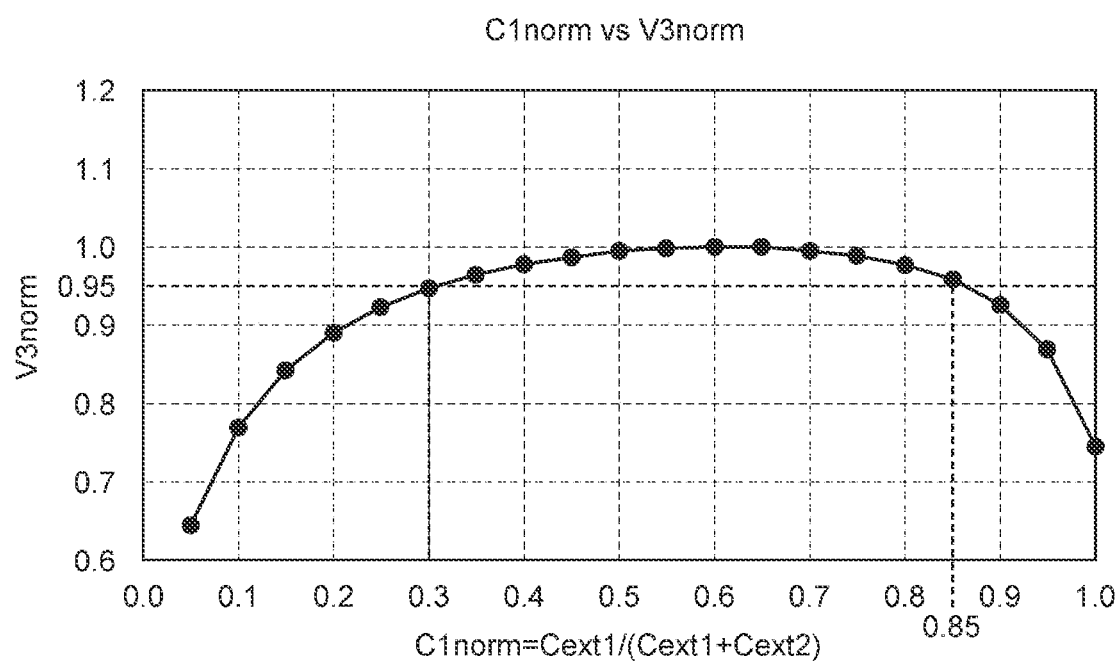
FIG. 15 is a graph illustrating an example of a relation between the ratio of the capacitance of the capacitive elements and the voltage of the transmission signal in the transmission driver according to the second embodiment.

FIG. 14 is a chart illustrating an example of the relation between the capacitance of the capacitive elements Cext1 and Cext2 and the voltage of the transmission signal OUT in the transmission driver 152B according to the second embodiment. FIG. 15 is a graph illustrating an example of the relation between a ratio C1norm of the capacitance of the capacitive element Cext1 to the capacitance of the capacitive element Cext2 and a voltage ratio V3norm of the transmission signal OUT in the transmission driver 152B according to the second embodiment. It is assumed in FIGS. 14 and 15 that the total capacitance of the capacitive elements Cext1 and Cext2 is 100 pF. It is also assumed in FIGS. 14 and 15 that the second voltage V1 is 11 V. It is also assumed in FIGS. 14 and 15 that the parasitic capacitance Cout is 10 pF.

FIG. 14 illustrates a ratio of the capacitance of the capacitive element Cext1 to the capacitance of the capacitive element Cext2 and values of the third voltage V2 and the sixth voltage V3 for each combination of capacitance when the capacitance of the capacitive element Cext1 and the capacitance of the capacitive element Cext2 are changed at 5 pF intervals. FIG. 14 also illustrates, for each combination of capacitance, the ratio C1norm that is a ratio of the capacitance of the capacitive element Cext1 to the total value of the capacitance of the capacitive elements Cext1 and Cext2 and the voltage ratio V3norm that is a ratio of the sixth voltage V3 in one combination to the maximum value of the sixth voltage V3 in the combinations.

As illustrated in FIGS. 14 and 15, the sixth voltage V3 is equal to or greater than 26.7 V when the ratio C1norm of the capacitance of the capacitive element Cext1 to the capacitance of the capacitive element Cext2 is equal to or greater than 0.30 but smaller than 0.85. The value of the voltage ratio V3norm is equal to or greater than 0.95. Note that the case in which the ratio C1norm of the capacitance of the capacitive element Cext1 to the capacitance of the capacitive element Cext2 is equal to or greater than 0.30 but smaller than 0.85 is a case in which the ratio of the capacitive element Cext1 to the capacitive element Cext2 is equal to or greater than 0.43 but smaller than 5.67 in other words. Moreover, when the ratio C1norm of the capacitance of the capacitive element Cext1 to the capacitance of the capacitive element Cext2 is 0.60, the values of the sixth voltage V3 and the voltage ratio V3norm are maximum values, which are 28.19 V and 1.00, respectively. The case in which the ratio C1norm of capacitance is 0.60 is a case in which the ratio of the capacitive element Cext1 to the capacitive element Cext2 is 1.50. Accordingly, the value of the sixth voltage V3 becomes higher when the ratio C1norm of the capacitance of the capacitive element Cext1 to the capacitance of the capacitive element Cext2 is set to be equal to or greater than 0.30 but smaller than 0.85. The value of the sixth voltage V3 is maximized when the ratio C1norm of the capacitance of the capacitive element Cext1 to the capacitance of the capacitive element Cext2 is set to 0.60.

Effects

In the second embodiment, the transmission driver 152B further includes the third mode of transmitting the transmission signal OUT with the voltage ranging from the voltage GND (first voltage) to the sixth voltage higher than the third voltage.

According to the configuration, the transmission driver 152B can output the transmission signal OUT with the voltage (sixth voltage) even higher than the supplied third voltage, and the voltage of the power supply that supplies the voltage VDD can further be reduced. Thus, the transmission driver 152B can independently reduce the power consumption more.

In the second embodiment, the transmission driver 152B further includes the first booster circuit 155 that supplies the third voltage or the sixth voltage.

According to the configuration, the first booster circuit 155 in the transmission driver 152B can supply the voltage (sixth voltage) even higher than the third voltage, and the voltage of the power supply that supplies the voltage VDD can further be reduced. Thus, the transmission driver 152B can independently reduce the power consumption more.

In the second embodiment, the transmission driver 152B further includes the second booster circuit 156 that supplies, to the first booster circuit 155, the seventh voltage higher than the voltage GND (first voltage) by the difference between the third voltage and the voltage VDD (second voltage) or the eighth voltage higher than the voltage GND by the difference between the sixth voltage and the voltage VDD (second voltage).

According to the configuration, the second booster circuit 156 in the transmission driver 152B supplies the voltage to the first booster circuit 155. Thus, the transmission driver 152B can independently reduce the power consumption more with a simple configuration.

In the second embodiment, the first booster circuit 155 includes the first capacitive element Cext1 that supplies the third voltage V2 or the sixth voltage V3 from one end, the second booster circuit 156 includes the second capacitive element Cext2 that supplies the seventh voltage or the eighth voltage from one end to the first booster circuit 155, and the capacitance of the first capacitive element Cext1 is 0.6 times the total capacitance of the first capacitive element Cext1 and the second capacitive element Cext2.

According to the configuration, the sixth voltage V3 becomes higher voltage in the transmission driver 152B. Thus, the transmission driver 152B can independently reduce the power consumption more with a simple configuration.

Third Embodiment

This completes the description of the second embodiment. Next, a third embodiment will be described.

Circuit Configuration

Figure 11:
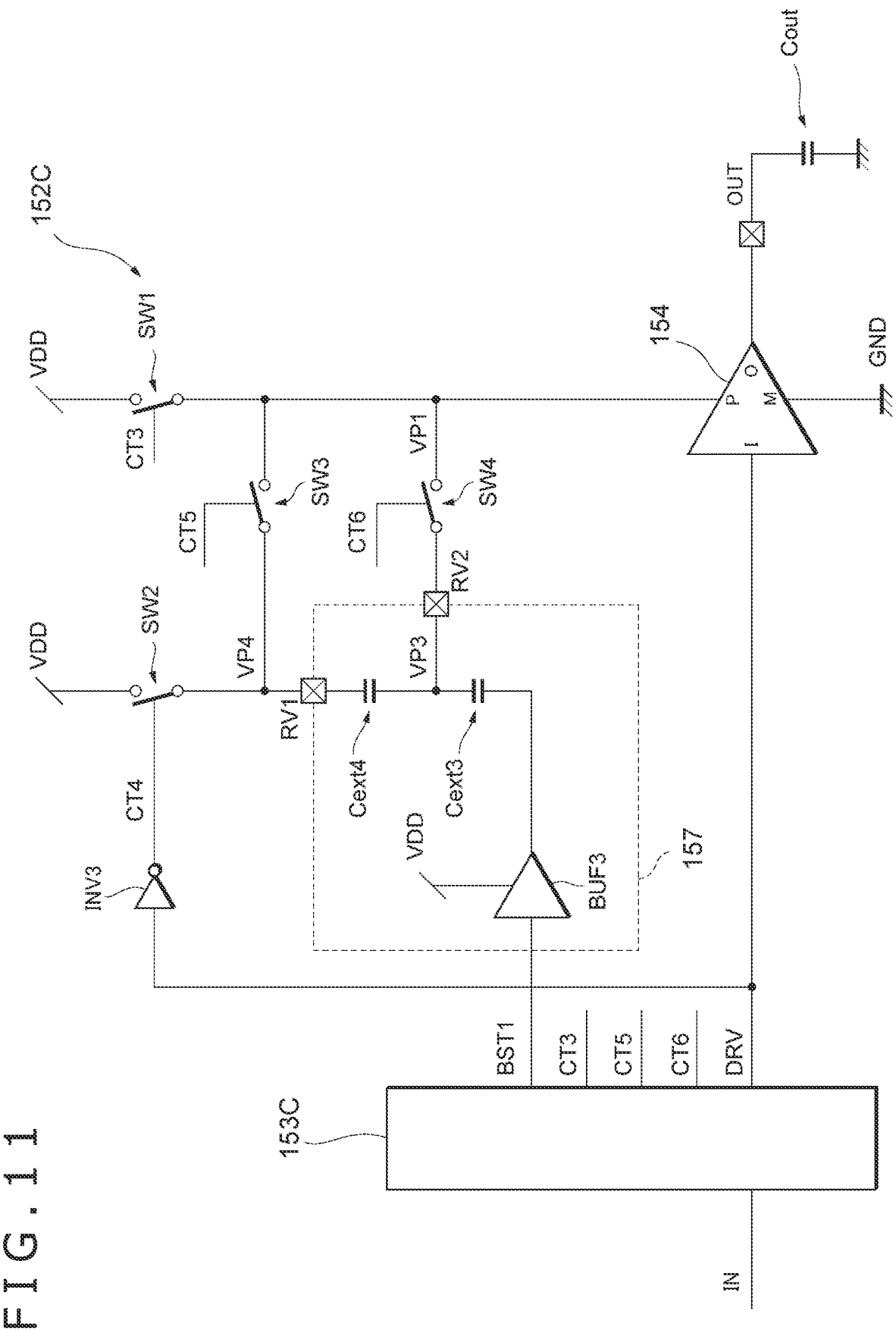
FIG. 11 depicts an example of a transmission driver according to a third embodiment.

FIG. 11 depicts an example of a circuit configuration of a transmission driver 152C according to the third embodiment. As illustrated in FIG. 11, the transmission driver 152C includes, for example, a signal generation circuit 153C, the output control circuit 154, a third booster circuit 157, short-circuit control elements SW1 to SW4, and a NOT circuit INV3. Note that, in the description of the circuit configuration of the transmission driver 152C, the description of components similar to the components of the transmission driver 152A will appropriately be skipped.

The signal generation circuit 153C generates the drive signal DRV and the boost signal BST1 according to the input signal IN that is input. The signal generation circuit 153C outputs the generated drive signal DRV to the NOT circuit INV3 and the output control circuit 154 and outputs the generated boost signal BST1 to a buffer circuit BUF3 of the third booster circuit 157. Specifically, the signal generation circuit 153C generates the drive signal DRV such that the voltage is shifted from the low level to the high level at the first timing and that the voltage is shifted from the high level to the low level at the fourth timing. The signal generation circuit 153C generates the boost signal BST1 such that the voltage is shifted from the low level to the high level at the second timing and that the voltage is shifted from the high level to the low level at the third timing.

The signal generation circuit 153C generates control signals CT3, CT5, and CT6 for controlling the short-circuit control elements SW1, SW3, and SW4. The signal generation circuit 153C uses the generated control signal CT3 to control the short-circuit control element SW1, uses the generated control signal CT5 to control the short-circuit control element SW3, and uses the generated control signal CT6 to control the short-circuit control element SW4.

The NOT circuit INV3 is, for example, an inverter circuit including a transistor, and functions as a control circuit that uses a control signal CT4 to control the short-circuit control element SW2. The NOT circuit INV3 performs a NOT operation of the drive signal DRV input from the signal generation circuit 153C, sets the signal that has been subjected to the operation, as the control signal CT4, and outputs the control signal CT4 to the control terminal of the short-circuit control element SW2.

The third booster circuit 157 includes, for example, the buffer circuit BUF3, capacitive elements Cext3 and Cext4, and output terminals RV1 and RV2. The third booster circuit 157 supplies ninth voltage that is voltage between the low level (first voltage) and the voltage VDD (second voltage), tenth voltage that is voltage between the voltage VDD (second voltage) and the voltage (third voltage) that is twice the voltage VDD, and the voltage (third voltage) that is twice the voltage VDD to the positive power supply terminal P of the output control circuit 154.

Specifically, when the voltage of the boost signal BST1 is in the low level, the third booster circuit 157 divides voltage VP4 of a node connected to the output terminal RV1 between the voltage VP4 and the low level, to generate the voltage (ninth voltage) that is 0.5 times the voltage VDD. When both ends of the short-circuit control element SW4 are short-circuited, the third booster circuit 157 supplies the voltage (ninth voltage) that is 0.5 times the voltage VDD from the output terminal RV2 to the positive power supply terminal P of the output control circuit 154 through the short-circuit control element SW4. When the voltage of the boost signal BST1 output from the signal generation circuit 153C is in the high level, the third booster circuit 157 boosts the voltage VP4 of the node connected to the output terminal RV1, to generate the voltage (third voltage) that is twice the voltage VDD. When both ends of the short-circuit control element SW3 are short-circuited, the third booster circuit 157 supplies the voltage (third voltage) that is twice the voltage VDD from the output terminal RV1 to the positive power supply terminal P of the output control circuit 154 through the short-circuit control element SW3. When the voltage of the boost signal BST1 output from the signal generation circuit 153C is in the high level, the third booster circuit 157 divides the voltage VP4 of the node connected to the output terminal RV1 between the voltage VP4 and the high level, to generate the voltage (tenth voltage) that is 1.5 times the voltage VDD. When both ends of the short-circuit control element SW4 are short-circuited, the third booster circuit 157 supplies the voltage (tenth voltage) that is 1.5 times the voltage VDD from the output terminal RV2 to the positive power supply terminal P of the output control circuit 154 through the short-circuit control element SW4.

The buffer circuit BUF3 is, for example, a buffer circuit including a MOS transistor. The buffer circuit BUF3 enhances the boost signal BST1 output from the signal generation circuit 153C and outputs the enhanced boost signal BST1 to the capacitive element Cext3. The buffer circuit BUF3 reduces or eliminates the electrical effect that the capacitive element Cext3 and the signal generation circuit 153C exert on each other. Although the buffer circuit BUF3 is provided on the transmission driver 152C in the third embodiment, the buffer circuit BUF3 may not be provided, and the boost signal BST1 may directly be input from the signal generation circuit 153C to one end of the capacitive element Cext3.

One end of the capacitive element Cext3 is connected to an output terminal of the buffer circuit BUF3, and the other end of the capacitive element Cext3 is connected to one end of the capacitive element Cext4 and the output terminal RV2. The capacitive element Cext3 supplies voltage VP3 from the output terminal RV2 to the positive power supply terminal P of the output control circuit 154 through the short-circuit control element SW4. The capacitance of the capacitive element Cext3 is, for example, 1 to 10 uF and is typically 1 uF.

One end of the capacitive element Cext4 is connected to the other end of the capacitive element Cext3 and the output terminal RV2, and the other end of the capacitive element Cext4 is connected to the output terminal RV1. The capacitive element Cext4 supplies the voltage VP4 from the output terminal RV1 to the positive power supply terminal P of the output control circuit 154 through the short-circuit control element SW3. The capacitance of the capacitive element Cext4 is, for example, 1 to 10 uF and is typically 1 uF. The capacitance of the capacitive element Cext4 is, for example, equal to that of the capacitive element Cext3.

The short-circuit control elements SW1 to SW4 are, for example, switch elements or transistors. The short-circuit control elements SW1 to SW4 short-circuit or open both ends according to control signals input to the control terminals.

One end of the short-circuit control element SW1 is connected to the power supply line W_VDD, and the other end of the short-circuit control element SW1 is connected to the other end of a short-circuit control element SW5, the other end of a short-circuit control element SW6, and the positive power supply terminal P of the output control circuit 154. When the state of the control signal CT3 is the high state, the short-circuit control element SW1 short-circuits both ends and supplies the voltage VDD of the power supply line W_VDD to the positive power supply terminal P of the output control circuit 154. On the other hand, when the state of the control signal CT3 is the low state, the short-circuit control element SW1 opens both ends and stops the supply of the voltage VDD of the power supply line W_VDD.

One end of the short-circuit control element SW2 is connected to the power supply line W_VDD, and the other end of the short-circuit control element SW2 is connected to the output terminal RV1 of the third booster circuit 157 and one end of the short-circuit control element SW3. When the state of the control signal CT4 is the high state, the short-circuit control element SW2 short-circuits both ends and supplies the voltage VDD of the power supply line W_VDD to the output terminal RV1 of the third booster circuit 157. On the other hand, when the state of the control signal CT4 is the low state, the short-circuit control element SW2 opens both ends and stops the supply of the voltage VDD of the power supply line W_VDD.

One end of the short-circuit control element SW3 is connected to the other end of the short-circuit control element SW2 and the output terminal RV1 of the third booster circuit 157, and the other end of the short-circuit control element SW3 is connected to the other end of the short-circuit control element SW1, the other end of the short-circuit control element SW4, and the positive power supply terminal P of the output control circuit 154. When the state of the control signal CT5 is the high state, the short-circuit control element SW3 short-circuits both ends and supplies the voltage VP4 of the output terminal RV1 of the third booster circuit 157 to the positive power supply terminal P of the output control circuit 154. On the other hand, when the state of the control signal CT5 is the low state, the short-circuit control element SW3 opens both ends and stops the supply of the voltage VDD of the power supply line W_VDD.

One end of the short-circuit control element SW4 is connected to the output terminal RV2 of the third booster circuit 157, and the other end of the short-circuit control element SW4 is connected to the other end of the short-circuit control element SW1, the other end of the short-circuit control element SW5, and the positive power supply terminal P of the output control circuit 154. When the state of the control signal CT6 is the high state, the short-circuit control element SW4 short-circuits both ends and supplies the voltage VP3 of the output terminal RV2 to the output terminal RV1 of the third booster circuit 157. On the other hand, when the state of the control signal CT6 is the low state, the short-circuit control element SW4 opens both ends and stops the supply of the voltage VDD of the power supply line W_VDD.

In the transmission driver 152C configured in this way, the operation mode of the transmission driver 152C is the first mode while the short-circuit control element SW1 is short-circuited, and the voltage VDD (second voltage) is supplied from the power supply line W_VDD to the positive power supply terminal P of the output control circuit 154.

While the short-circuit control elements SW1, SW2, and SW4 are open but the short-circuit control element SW3 is short-circuited, the operation mode of the transmission driver 152C is the second mode. The short-circuit control element SW1 cuts off the supply of the voltage VDD to the output control circuit 154, and the voltage VP4 is supplied from the output terminal RV1 of the third booster circuit 157 to the positive power supply terminal P of the output control circuit 154 through the short-circuit control element SW3. In the second mode, the voltage VP1 is voltage equivalent to the sum of the voltage VP4 and the voltage of one end of the capacitive element Cext3 determined by the boost signal BST1 corresponding to the input signal IN. Specifically, the voltage VP1 is the voltage VDD (second voltage) when the voltage of one end of the capacitive element Cext3 is the voltage GND, and the voltage VP1 is the voltage (third voltage) that is twice the voltage VDD when the voltage of one end of the capacitive element Cext3 is the voltage VDD.

While the short-circuit control elements SW1 to SW3 are open but the short-circuit control element SW4 is short-circuited, the short-circuit control element SW1 cuts off the supply of the voltage VDD to the output control circuit 154, and the voltage VP3 is supplied from the output terminal RV2 of the third booster circuit 157 to the positive power supply terminal P of the output control circuit 154 through the short-circuit control element SW4. While the short-circuit control elements SW1 to SW3 are open but the short-circuit control element SW4 is short-circuited, the voltage VP1 is voltage equivalent to the sum of the voltage VP3 and the voltage of one end of the capacitive element Cext3 determined by the boost signal BST1 corresponding to the input signal IN. Specifically, when the voltage of one end of the capacitive element Cext3 is the voltage GND, the operation mode of the transmission driver 152C is the fourth mode, and the voltage VP1 is the voltage (ninth voltage) that is 0.5 times the voltage VDD. On the other hand, when the voltage of one end of the capacitive element Cext3 is the voltage VDD, the operation mode of the transmission driver 152C is a fifth mode, and the voltage VP1 is the voltage (tenth voltage) that is 1.5 times the voltage VDD.

The transmission driver 152C sets, as the transmission signal OUT, the voltage supplied to the positive power supply terminal P of the output control circuit 154 or the voltage supplied to the negative power supply terminal M of the output control circuit 154, according to the state of the input signal IN, and transmits the transmission signal OUT to the electrode 20 or the linear electrode 32. That is, the transmission driver 152C generates the transmission signal OUT in which the voltage shifts to the voltage (ninth voltage) that is 0.5 times the voltage VDD, the voltage VDD (second voltage), the voltage (tenth voltage) that is 1.5 times the voltage VDD, the voltage (third voltage) that is twice the voltage VDD, and the voltage GND (first voltage), according to the input signal IN, and the transmission driver 152C transmits the transmission signal OUT to the electrode 20 or the linear electrode 32.

Flow of a Series of Operations Regarding Transmission Driver

Figure 12:
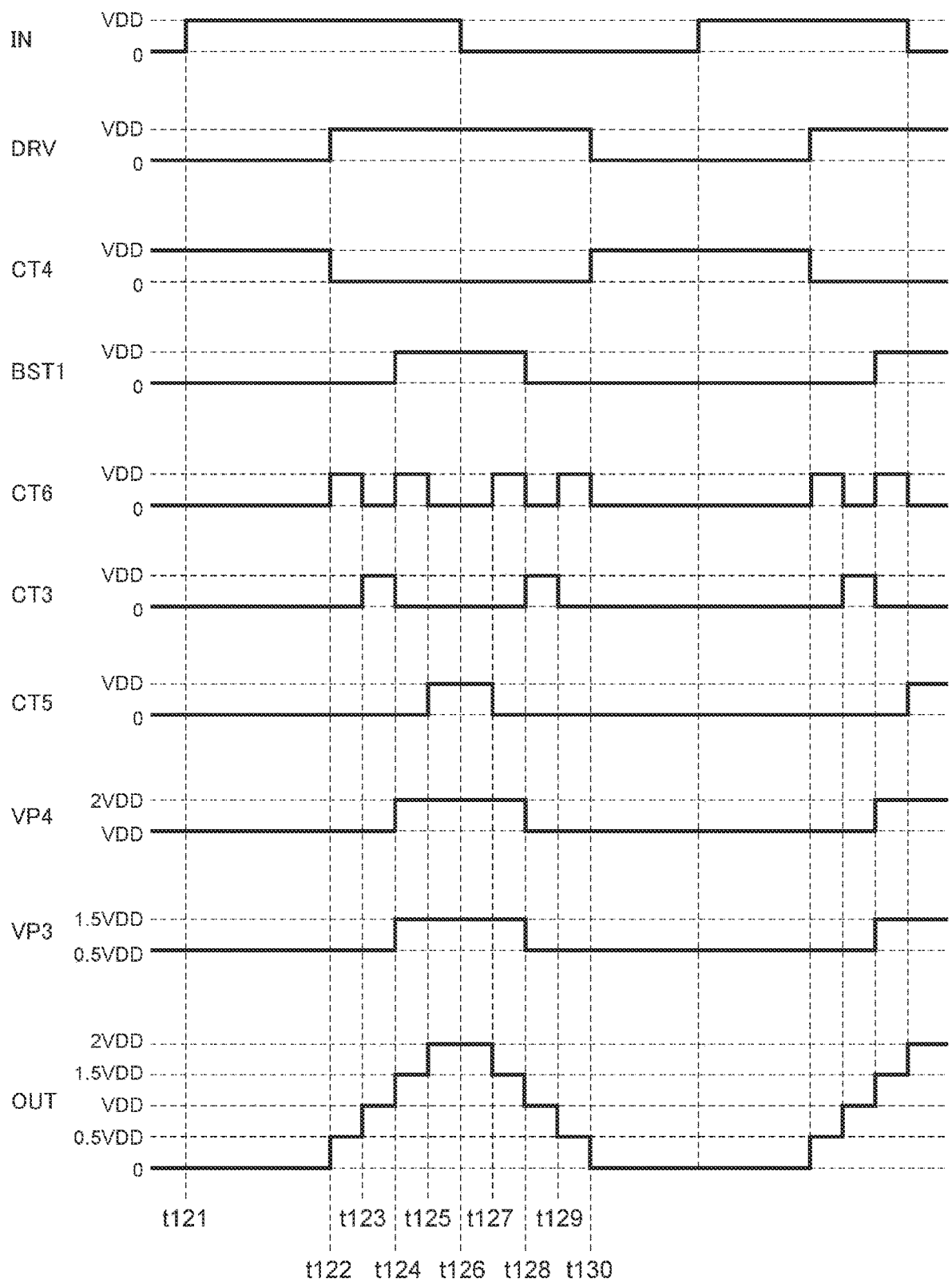
FIG. 12 is a timing chart illustrating an example of a shift in voltage of each signal in the transmission driver according to the third embodiment.

This completes the description of the configuration of the transmission driver 152C. Next, the shift in the voltage of each signal in the transmission driver 152C will be described in detail. FIG. 12 is a timing chart illustrating an example of the shift in the voltage of each signal in the transmission driver 152C according to the third embodiment.

At time t121, the operation mode of the transmission driver 152C is the first mode. At time t121, the driver selection circuit 151 or the controller 28 shifts the voltage of the input signal IN from 0 V to the voltage VDD. At time t121, the signal generation circuit 153C detects a rise in the voltage of the input signal IN. At time t121, the short-circuit control element SW2 is short-circuited, and the voltage VDD is supplied from the power supply line W_VDD to the other end of the capacitive element Cext4 through the output terminal RV1 of the third booster circuit 157. At time t121, the short-circuit control elements SW1, SW3, and SW4 are open. Accordingly, the voltage of the voltage VP4 is the voltage VDD (second voltage) at time t121. At time t121, the signal generation circuit 153C sets the voltage of the boost signal BST1 to 0 V and outputs the boost signal BST1 to the buffer circuit BUF3. In association with this, the third booster circuit 157 supplies the voltage of 0 V to one end of the capacitive element Cext3. At time t121, the voltage VP3 is the voltage (ninth voltage) that is 0.5 times the voltage VDD. At time t121, the output control circuit 154 sets the voltage of the transmission signal OUT to 0 V (first voltage) and transmits the transmission signal OUT to the electrode 20 or the linear electrode 32.

At time t122, the operation mode of the transmission driver 152C is switched from the first mode to the fourth mode. At time t122, the signal generation circuit 153C shifts the voltage of the drive signal DRV from 0 V to the voltage VDD according to a rise of the input signal IN. At time t122, the NOT circuit INV3 shifts the voltage of the control signal CT4 from the voltage VDD to 0 V. At time t122, both ends of the short-circuit control element SW2 are opened according to the control signal CT4 in which the voltage is 0 V. At time t122, the supply of the voltage VDD (second voltage) from the power supply line W_VDD to the other end of the capacitive element Cext4 through the output terminal RV1 of the third booster circuit 157 stops. At time t122, the signal generation circuit 153C shifts the voltage of the control signal CT6 from 0 V to the voltage VDD. At time t122, both ends of the short-circuit control element SW4 are short-circuited according to the control signal CT6 in which the voltage is the voltage VDD. In association with this, the third booster circuit 157 supplies the voltage VP3 from the output terminal RV2 to the positive power supply terminal P of the output control circuit 154 through the short-circuit control element SW4 at time t122. Accordingly, at time t122, the voltage of the voltage VP1 is the voltage (ninth voltage) that is 0.5 times the voltage VDD. At time t122, the output control circuit 154 shifts the voltage of the transmission signal OUT from 0 V (first voltage) to the voltage (ninth voltage) that is 0.5 times the voltage VDD supplied to the positive power supply terminal P, according to the drive signal DRV.

At time t123, the operation mode of the transmission driver 152C is switched from the fourth mode to the first mode. At time t123, the signal generation circuit 153C shifts the voltage of the control signal CT3 from 0 V to the voltage VDD and shifts the voltage of the control signal CT6 from the voltage VDD to 0 V. At time t123, both ends of the short-circuit control element SW4 are opened according to the control signal CT6 in which the voltage is 0 V. At time t123, both ends of the short-circuit control element SW1 are short-circuited according to the control signal CT3 in which the voltage is the voltage VDD. In association with this, the supply of the voltage VP3 (ninth voltage: voltage 0.5 times the voltage VDD) from the output terminal RV2 of the third booster circuit 157 to the positive power supply terminal P of the output control circuit 154 through the short-circuit control element SW4 stops at time t123. At time t123, the voltage VDD is supplied from the power supply line W_VDD to the positive power supply terminal P of the output control circuit 154 through the short-circuit control element SW1. Accordingly, at time t123, the voltage of the voltage VP1 is the voltage VDD (second voltage). At time t123, the output control circuit 154 shifts the voltage of the transmission signal OUT from the voltage (ninth voltage) that is 0.5 times the voltage VDD to the voltage VDD (second voltage).

At time t124, the operation mode of the transmission driver 152C is switched from the first mode to the fifth mode. At time t124, the signal generation circuit 153C shifts the voltage of the control signal CT3 from the voltage VDD to 0 V, shifts the voltage of the control signal CT6 from 0 V to the voltage VDD, and shifts the voltage of the boost signal BST1 from 0 V to the voltage VDD. At time t124, both ends of the short-circuit control element SW1 are opened according to the control signal CT3 in which the voltage is 0 V. At time t124, the supply of the voltage VDD (second voltage) from the power supply line W_VDD to the positive power supply terminal P of the output control circuit 154 through the short-circuit control element SW1 stops. At time t124, the third booster circuit 157 supplies the voltage of the voltage VDD to one end of the capacitive element Cext3. In association with this, the capacitive elements Cext3 and Cext4 try to hold the voltage difference between the two ends, and the voltage VP4 of the other end of the capacitive element Cext4 shifts from the voltage VDD to the voltage (third voltage: 2×voltage VDD) equivalent to the sum of the voltage VDD and the voltage (potential VDD) of one end of the capacitive element Cext3, at time t124. The voltage VP3 of the other end of the capacitive element Cext3 shifts from the voltage 0.5 times the voltage VDD to the voltage (tenth voltage: 1.5×voltage VDD) equivalent to the sum of the voltage VDD and the voltage (potential VDD) of one end of the capacitive element Cext3. At time t124, both ends of the short-circuit control element SW4 are short-circuited according to the control signal CT6 in which the voltage is the voltage VDD. In association with this, the third booster circuit 157 supplies the voltage VP3 from the output terminal RV2 to the positive power supply terminal P of the output control circuit 154 through the short-circuit control element SW4 at time t124. Accordingly, at time t124, the voltage of the voltage VP1 is the voltage (tenth voltage) that is 1.5 times the voltage VDD. At time t124, the output control circuit 154 shifts the voltage of the transmission signal OUT from the voltage VDD (second voltage) to the voltage (tenth voltage) that is 1.5 times the voltage VDD.

At time t125, the operation mode of the transmission driver 152C is switched from the fifth mode to the second mode. At time t125, the signal generation circuit 153C shifts the voltage of the control signal CT6 from the voltage VDD to 0 V and shifts the voltage of the control signal CT5 from 0 V to the voltage VDD. At time t125, both ends of the short-circuit control elements SW4 are opened according to the control signal CT6 in which the voltage is 0 V. At time t125, the supply of the voltage VP3 from the output terminal RV2 of the third booster circuit 157 to the positive power supply terminal P of the output control circuit 154 through the short-circuit control element SW4 stops. At time t125, both ends of the short-circuit control element SW3 are short-circuited according to the control signal CT5 in which the voltage is the voltage VDD. In association with this, the third booster circuit 157 supplies the voltage VP4 from the output terminal RV1 to the positive power supply terminal P of the output control circuit 154 through the short-circuit control element SW3 at time t125. Accordingly, at time t125, the voltage of the voltage VP1 is the voltage (third voltage) that is twice the voltage VDD. At time t125, the output control circuit 154 shifts the voltage of the transmission signal OUT from the voltage (tenth voltage) that is 1.5 times the voltage VDD to the voltage (third voltage) that is twice the voltage VDD.

At time t126, the driver selection circuit 151 or the controller 28 shifts the voltage of the input signal IN from the voltage VDD to 0 V. At time t126, the signal generation circuit 153C detects a fall in the voltage of the input signal IN. At time t126, the output control circuit 154 keeps the voltage of the transmission signal OUT set to the voltage VP1 (third voltage: 2×voltage VDD) and transmits the transmission signal OUT to the electrode 20 or the linear electrode 32.

At time t127, the operation mode of the transmission driver 152C is switched from the second mode to the fifth mode. At time t127, the signal generation circuit 153C shifts the voltage of the control signal CT6 from 0 V to the voltage VDD and shifts the voltage of the control signal CT5 from the voltage VDD to 0 V. At time t127, both ends of the short-circuit control element SW3 are opened according to the control signal CT5 in which the voltage is 0 V. At time t127, the supply of the voltage VP4 (third voltage: voltage twice the voltage VDD) from the output terminal RV1 of the third booster circuit 157 to the positive power supply terminal P of the output control circuit 154 through the short-circuit control element SW3 stops. At time t127, both ends of the short-circuit control element SW4 are short-circuited according to the control signal CT6 in which the voltage is the voltage VDD. In association with this, the third booster circuit 157 supplies the voltage VP3 from the output terminal RV2 to the positive power supply terminal P of the output control circuit 154 through the short-circuit control element SW4 at time t127. Accordingly, at time t127, the voltage of the voltage VP1 is the voltage (tenth voltage) 1.5 times the voltage VDD at time t127. At time t127, the output control circuit 154 shifts the voltage of the transmission signal OUT from the voltage (third voltage) twice the voltage VDD to the voltage (tenth voltage) 1.5 times the voltage VDD.

At time t128, the operation mode of the transmission driver 152C is switched from the fifth mode to the first mode. At time t128, the signal generation circuit 153C shifts the voltage of the control signal CT3 from 0 V to the voltage VDD, shifts the voltage of the control signal CT6 from the voltage VDD to 0 V, and shifts the voltage of the boost signal BST1 from the voltage VDD to 0 V. At time t128, both ends of the short-circuit control element SW4 are opened according to the control signal CT6 in which the voltage is 0 V. At time t128, both ends of the short-circuit control element SW1 are short-circuited according to the control signal CT3 in which the voltage is the voltage VDD. In association with this, the capacitive elements Cext3 and Cext4 try to hold the voltage difference between the two ends, and the voltage VP4 of the other end of the capacitive element Cext4 shifts from the voltage (third voltage) that is twice the voltage VDD to the voltage VDD (second voltage) at time t128. The voltage VP3 of the other end of the capacitive element Cext3 shifts from the voltage (tenth voltage) that is 1.5 times the voltage VDD to the voltage (ninth voltage) that is 0.5 times the voltage VDD. At time t128, the supply of the voltage VP3 (ninth voltage: voltage 0.5 times the voltage VDD) from the output terminal RV2 of the third booster circuit 157 to the positive power supply terminal P of the output control circuit 154 through the short-circuit control element SW4 stops. At time t128, the voltage VDD is supplied from the power supply line W_VDD to the positive power supply terminal P of the output control circuit 154 through the short-circuit control element SW1. Accordingly, at time t128, the voltage of the voltage VP1 is the voltage VDD (second voltage). At time t128, the output control circuit 154 shifts the voltage of the transmission signal OUT from the voltage (tenth voltage) that is 1.5 times the voltage VDD to the voltage VDD (second voltage).

At time t129, the operation mode of the transmission driver 152C is switched from the first mode to the fourth mode. At time t129, the signal generation circuit 153C shifts the voltage of the control signal CT6 from 0V to the voltage VDD and shifts the voltage of the control signal CT3 from the voltage VDD to 0 V. At time t129, both ends of the short-circuit control element SW1 are opened according to the control signal CT3 in which the voltage is 0 V. In association with this, the supply of the voltage VDD (second voltage) from the power supply line W_VDD to the positive power supply terminal P of the output control circuit 154 through the short-circuit control element SW1 stops at time t129. At time t129, both ends of the short-circuit control element SW4 are short-circuited according to the control signal CT6 in which the voltage is the voltage VDD. In association with this, the third booster circuit 157 supplies the voltage VP3 from the output terminal RV2 of the third booster circuit 157 to the positive power supply terminal P of the output control circuit 154 through the short-circuit control element SW4 at time t129. Accordingly, at time t129, the voltage of the voltage VP1 is the voltage (ninth voltage) that is 0.5 times the voltage VDD. At time t129, the output control circuit 154 shifts the voltage of the transmission signal OUT from the voltage VDD (second voltage) to the voltage (ninth voltage) that is 0.5 times the voltage VDD.

At time t130, the operation mode of the transmission driver 152C is switched from the fourth mode to the first mode. At time t130, the signal generation circuit 153C shifts the voltage of the drive signal DRV from the voltage VDD to 0 V according to a fall of the input signal IN. At time t130, the NOT circuit INV3 shifts the voltage of the control signal CT4 from 0 V to the voltage VDD. At time t130, both ends of the short-circuit control element SW2 are short-circuited according to the control signal CT4 in which the voltage is the voltage VDD. At time t130, the voltage VDD (second voltage) is supplied from the power supply line W_VDD to the other end of the capacitive element Cext2 through the short-circuit control element SW2. At time t130, the output control circuit 154 shifts the voltage of the transmission signal OUT from the voltage (ninth voltage) that is 0.5 times the voltage VDD to 0 V (first voltage) supplied to the negative power supply terminal M, according to the drive signal DRV.

Note that the time period from time t122 to time t123, the time period from time t123 to time t124, and the time period from time t124 to time t125 are, for example, equal to or smaller than ¼ the time period from time t122 to time t126. The time period from time t127 to time t128, the time period from time t128 to time t129, and the time period from time t129 to time t130 are, for example, equal to or smaller than ¼ the time period from time t126 to time t130.

Figure 13:
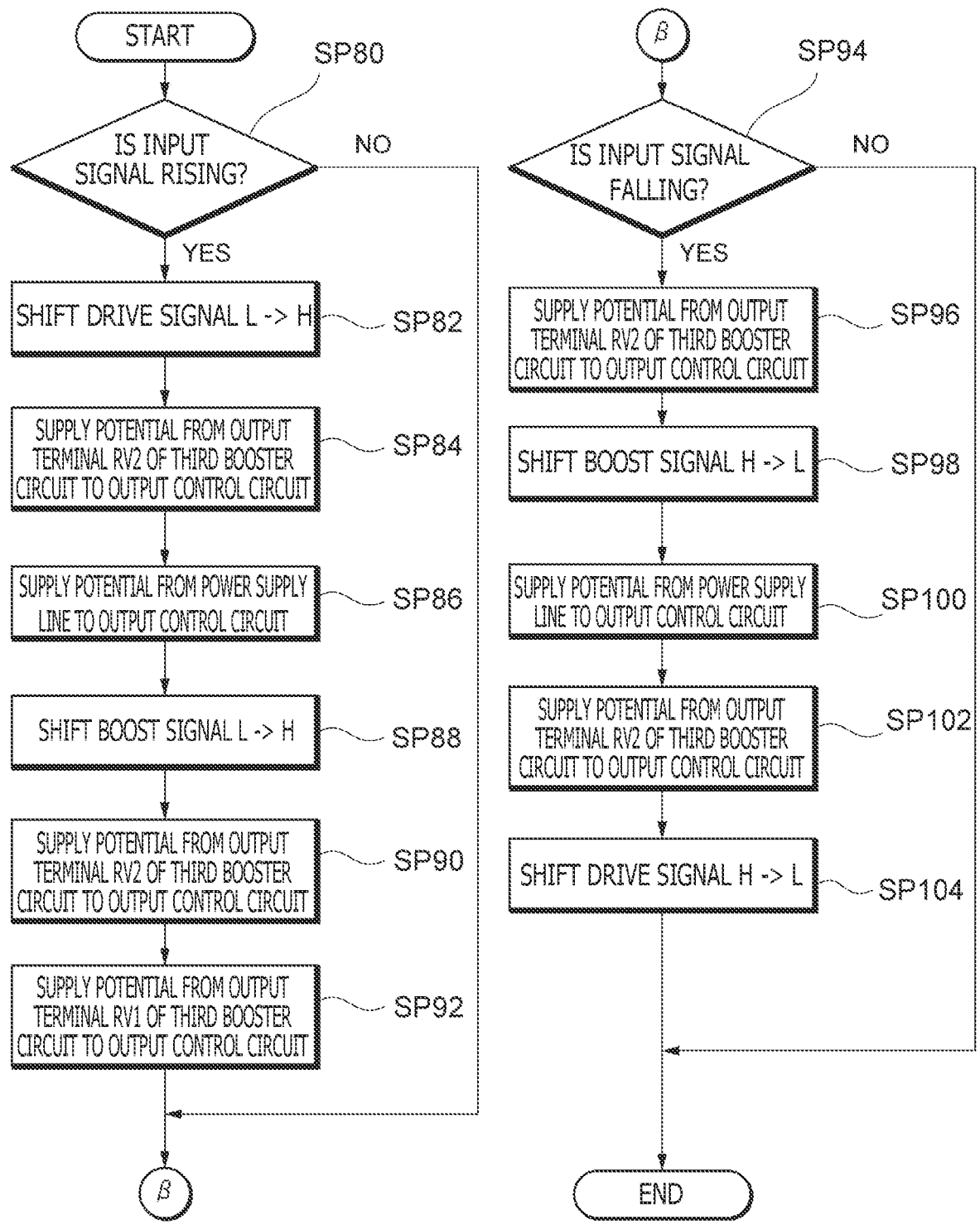
FIG. 13 is a flow chart illustrating an example of a flow of a series of processes of an electronic device including the transmission driver according to the third embodiment.

This completes the description of the example of the shift in the voltage of each signal in the transmission driver 152C. Next, a flow of a series of processes of an electronic device (stylus 2 or touch sensor mounted apparatus 3) including the transmission driver 152C will be described in detail. FIG. 13 is a flow chart illustrating an example of a flow of a series of processes of the electronic device including the transmission driver 152C according to the third embodiment.

(Step SP80)

In the electronic device, the signal generation circuit 153C of the transmission driver 152C determines whether or not the signal waveform of the input signal IN is rising. If the electronic device determines that the signal waveform of the input signal IN is rising, the process moves to a process of step SP82. On the other hand, if the electronic device determines that the signal waveform of the input signal IN is not rising, the process moves to a process of step SP94.

(Step SP82)

The operation mode of the electronic device is the first mode. In the electronic device, the transmission driver 152C transmits the transmission signal OUT with the voltage of 0 V (first voltage). The electronic device causes the signal generation circuit 153C to shift the voltage of the drive signal DRV from 0 V to the voltage VDD and outputs the drive signal DRV to the output control circuit 154. The electronic device opens the short-circuit control element SW2 to stop the supply of the voltage VDD (second voltage) from the power supply line W_VDD to the other end of the capacitive element Cext4. The short-circuit control elements SW1, SW3, and SW4 are open in the electronic device. In the electronic device, the third booster circuit 157 generates the voltage (ninth voltage) that is 0.5 times the voltage VDD. The process then moves to a process of step SP84.

(Step SP84)

The electronic device switches the operation mode from the first mode to the fourth mode. In the electronic device in the fourth mode, the transmission driver 152C transmits the transmission signal OUT with the voltage in a range from 0 V (first voltage) to the voltage (ninth voltage) between 0 V (first voltage) and the voltage VDD (second voltage). The electronic device short-circuits the short-circuit control element SW4 to supply the voltage (ninth voltage) that is 0.5 times the voltage VDD from the output terminal RV2 of the third booster circuit 157 to the positive power supply terminal P of the output control circuit 154. As a result, the electronic device causes the output control circuit 154 to shift the voltage of the transmission signal OUT from 0 V (first voltage) to the voltage (ninth voltage) that is 0.5 times the voltage VDD. The process then moves to a process of step SP86.

(Step SP86)

The electronic device switches the operation mode from the fourth mode to the first mode. The electronic device opens the short-circuit control element SW4 to stop the supply of the voltage (ninth voltage) that is 0.5 times the voltage VDD from the output terminal RV2 of the third booster circuit 157 to the positive power supply terminal P of the output control circuit 154. The electronic device short-circuits the short-circuit control element SW1 to supply the voltage VDD (second voltage) from the power supply line W_VDD to the positive power supply terminal P of the output control circuit 154. As a result, the electronic device causes the output control circuit 154 to shift the voltage of the transmission signal OUT from the voltage (ninth voltage) that is 0.5 times the voltage VDD to the voltage VDD (second voltage). The process then moves to a process of step SP88.

(Step SP88)

The electronic device switches the operation mode from the first mode to the fifth mode. In the electronic device in the fifth mode, the transmission driver 152C transmits the transmission signal OUT with the voltage in a range from the voltage VDD (second voltage) to the voltage (tenth voltage) that is between the voltage (third voltage) higher than the voltage VDD (second voltage) and the voltage VDD (second voltage). The electronic device causes the signal generation circuit 153C to shift the voltage of the boost signal BST1 from 0 V to the voltage VDD and outputs the boost signal BST1 to the buffer circuit BUF3. In association with this, the voltage VP4 of the other end of the capacitive element Cext4 shifts from the voltage VDD (second voltage) to the voltage (third voltage) that is twice the voltage VDD. The voltage VP3 of the other end of the capacitive element Cext3 shifts from the voltage (ninth voltage) that is 0.5 times the voltage VDD to the voltage (tenth voltage) that is 1.5 times the voltage VDD. The process then moves to a process of step SP90.

(Step SP90)

The electronic device opens the short-circuit control element SW1 to stop the supply of the voltage VDD (second voltage) from the power supply line W_VDD to the positive power supply terminal P of the output control circuit 154. The electronic device short-circuits the short-circuit control element SW4 to supply the voltage (tenth voltage) that is 1.5 times the voltage VDD from the output terminal RV2 of the third booster circuit 157 to the positive power supply terminal P of the output control circuit 154. As a result, the electronic device causes the output control circuit 154 to shift the voltage of the transmission signal OUT from the voltage VDD (second voltage) to the voltage (tenth voltage) that is 1.5 times the voltage VDD. The process then moves to a process of step SP92.

(Step SP92)

The electronic device switches the operation mode from the fifth mode to the second mode. The electronic device opens the short-circuit control element SW4 to stop the supply of the voltage (tenth voltage) 1.5 times the voltage VDD from the output terminal RV2 of the third booster circuit 157 to the positive power supply terminal P of the output control circuit 154. The electronic device short-circuits the short-circuit control element SW3 to supply the voltage (third voltage) twice the voltage VDD from the output terminal RV1 of the third booster circuit 157 to the positive power supply terminal P of the output control circuit 154. As a result, the electronic device causes the output control circuit 154 to shift the voltage of the transmission signal OUT from the voltage (tenth voltage) that is 1.5 times the voltage VDD to the voltage (third voltage) that is twice the voltage VDD. The process then moves to a process of step SP94.

(Step SP94)

In the electronic device, the signal generation circuit 153C of the transmission driver 152C determines whether or not the signal waveform of the input signal IN is falling. If the electronic device determines that the signal waveform of the input signal IN is falling, the process moves to a process of step SP96. On the other hand, if the electronic device determines that the signal waveform of the input signal IN is not falling, the process ends the series of processes in FIG. 13.

(Step SP96)

The operation mode is switched from the second mode to the fifth mode. The electronic device causes the signal generation circuit 153C to shift the voltage of the drive signal DRV from the voltage VDD to 0 V and outputs the drive signal DRV to the output control circuit 154. The electronic device opens the short-circuit control element SW3 to stop the supply of the voltage (third voltage) that is twice the voltage VDD from the output terminal RV1 of the third booster circuit 157 to the positive power supply terminal P of the output control circuit 154. The electronic device short-circuits the short-circuit control element SW4 to supply the voltage (tenth voltage) that is 1.5 times the voltage VDD from the output terminal RV2 of the third booster circuit 157 to the positive power supply terminal P of the output control circuit 154. The process then moves to a process of step SP98.

(Step SP98)

The electronic device switches the operation mode from the fifth mode to the first mode. The electronic device causes the signal generation circuit 153C to shift the voltage of the boost signal BST1 from the voltage VDD to 0 V and outputs the boost signal BST1 to the buffer circuit BUF3. In association with this, the voltage VP4 of the other end of the capacitive element Cext4 shifts from the voltage (third voltage) that is twice the voltage VDD to the voltage VDD (second voltage). The voltage VP3 of the other end of the capacitive element Cext3 shifts from the voltage (tenth voltage) that is 1.5 times the voltage VDD to the voltage (ninth voltage) that is 0.5 times the voltage VDD. The process then moves to a process of step SP100.

(Step SP100)

The electronic device opens the short-circuit control element SW4 to stop the supply of the voltage (tenth voltage) that is 1.5 times the voltage VDD from the output terminal RV2 of the third booster circuit 157 to the positive power supply terminal P of the output control circuit 154. The electronic device short-circuits the short-circuit control element SW1 to supply the voltage VDD (second voltage) from the power supply line W_VDD to the positive power supply terminal P of the output control circuit 154. As a result, the electronic device causes the output control circuit 154 to shift the voltage of the transmission signal OUT from the voltage (tenth voltage) that is 1.5 times the voltage VDD to the voltage VDD (second voltage). The process then moves to a process of step SP102.

(Step SP102)

The electronic device switches the operation mode from the first mode to the fourth mode. The electronic device opens the short-circuit control element SW1 to stop the supply of the voltage VDD (second voltage) from the power supply line W_VDD to the positive power supply terminal P of the output control circuit 154. The electronic device short-circuits the short-circuit control element SW4 to supply the voltage (ninth voltage) 0.5 times the voltage VDD from the output terminal RV2 of the third booster circuit 157 to the positive power supply terminal P of the output control circuit 154. As a result, the electronic device causes the output control circuit 154 to shift the voltage of the transmission signal OUT from the voltage VDD (second voltage) to the voltage (ninth voltage) that is 0.5 times the voltage VDD. The process then moves to a process of step SP104.

(Step SP104)

The electronic device switches the operation mode from the fourth mode to the first mode. The electronic device opens the short-circuit control element SW4 to stop the supply of the voltage (ninth voltage) 0.5 times the voltage VDD from the output terminal RV2 of the third booster circuit 157 to the positive power supply terminal P of the output control circuit 154. The electronic device causes the signal generation circuit 153C to shift the voltage of the drive signal DRV from the voltage VDD to 0 V and outputs the drive signal DRV to the output control circuit 154. As a result, the electronic device causes the output control circuit 154 to shift the voltage of the transmission signal OUT from the voltage (ninth voltage) that is 0.5 times the voltage VDD and that is supplied to the positive power supply terminal P to 0 V (first voltage) supplied to the negative power supply terminal M.

Effects

In the third embodiment, the transmission driver 152C further includes the fourth mode of transmitting the transmission signal OUT with the voltage ranging from the voltage GND (first voltage) to the ninth voltage that is voltage between the voltage GND (first voltage) and the voltage VDD (second voltage) and the fifth mode of transmitting the transmission signal OUT with the voltage ranging from the voltage GND (first voltage) to the tenth voltage that is voltage between the voltage VDD (second voltage) and the third voltage.

According to the configuration, the transmission driver 152C can more finely control the voltage of the transmission signal OUT between the voltage GND (first voltage) and the third voltage.

In the third embodiment, the transmission driver 152C further includes the third booster circuit 157 that supplies the ninth voltage, the tenth voltage, or the third voltage.

According to the configuration, the third booster circuit 157 in the transmission driver 152C can supply the ninth voltage, the tenth voltage, and the third voltage, and the transmission driver 152C can more finely control the voltage of the transmission signal OUT.

In the third embodiment, the third booster circuit 157 divides the voltage GND (first voltage) and the voltage VDD (second voltage) to generate the ninth voltage and boosts the generated ninth voltage by the amount of the voltage VDD (second voltage) to generate the tenth voltage.

According to the configuration, the transmission driver 152C can more finely control the voltage of the transmission signal OUT between the voltage GND (first voltage) and the third voltage with a simple configuration.

In the third embodiment, the third booster circuit 157 includes at least one or more capacitive elements Cext3 and Cext4, and the capacitive elements Cext3 and Cext4 supply charge or receive charge according to the shift in the voltage of the transmission signal OUT.

According to the configuration, the third booster circuit 157 in the transmission driver 152C includes the capacitive elements Cext3 and Cext4. The capacitive elements Cext3 and Cext4 supply charge, or charge is supplied to the capacitive elements Cext3 and Cext4, according to the shift in the voltage of the transmission signal OUT. Thus, the transmission driver 152C can independently reduce the power consumption more than the transmission driver 152A in the first embodiment.

Modifications

Note that the present disclosure is not limited to the embodiments. That is, those skilled in the art can appropriately change the design of the embodiments, and the changed embodiments are also included in the scope of the present disclosure as long as the changed embodiments have the features of the present disclosure. In addition, the elements included in the embodiments and modifications described later can be combined if technically possible, and the combinations are also included in the scope of the present disclosure as long as the combinations have the features of the present disclosure.

For example, although the signal generation circuits 153A and 153C set the high levels of the drive signal DRV and the boost signal BST1 to the voltage VDD (fourth voltage) and the voltage VDD (fifth voltage) and generate the signals such that the high levels have the same voltage in the first and third embodiments, the configuration is not limited to this. That is, the signal generation circuits 153A and 153C may generate the signals such that the high level (fourth voltage) of the drive signal DRV and the high level (fifth voltage) of the boost signal BST1 are different.

According to the configuration, the transmission drivers 152A and 152C can independently realize the reduction in power consumption even when there are two or more power supply systems. In addition, the transmission driver 152A can set the voltage of the transmission signal OUT to voltage equivalent to the sum of the high level (fifth voltage) of the boost signal BST1 and the voltage VDD (second voltage) of the power supply line W_VDD and output the transmission signal OUT. That is, the transmission driver 152A can adjust the high level (fifth voltage) of the boost signal BST1 to adjust the voltage (third voltage) to desirable voltage when the voltage of the transmission signal OUT is voltage exceeding the voltage VDD (second voltage). In addition, the transmission driver 152C can set the voltage of the transmission signal OUT to voltage equivalent to the sum of the high level of the boost signal BST1 and one of the voltage VDD (second voltage) and the voltage (ninth voltage) that is 0.5 times the voltage VDD and output the transmission signal OUT. That is, the transmission driver 152C can adjust the high level of the boost signal BST1 to adjust the voltage of the transmission signal OUT to desirable voltage.

Although the signal generation circuit 153B generates the drive signal DRV and the boost signals BST1 and BST2 such that the high levels of the signals have the same voltage in the second embodiment, the configuration is not limited to this. That is, the signal generation circuit 153B may generate the signals such that the high level of the drive signal DRV, the high level of the boost signal BST1, and the high level of the boost signal BST2 are different.

According to the configuration, the transmission driver 152B can independently realize the reduction in power consumption even when there are three or more power supply systems.

Although the signal generation circuit 153C generates the drive signal DRV and the boost signals BST1 and BST2 such that the high levels of the signals have the same voltage in the third embodiment, the configuration is not limited to this. That is, the signal generation circuit 153C may generate the signals such that the high level of the drive signal DRV, the high level of the boost signal BST1, and the high level of the boost signal BST2 are different.

According to the configuration, the transmission driver 152C can independently realize the reduction in power consumption even when there are three or more power supply systems.

Although one of the signal generation circuits 153A to 153C generates the drive signal DRV and the boost signals BST1 and BST2 according to the input signal IN in the first to third embodiments, the configuration is not limited to this.

For example, when a shift in voltage of the input signal IN is known in advance, a boost signal generation circuit that generates at least one of the boost signals BST1 and BST2 according to the pattern of the shift in voltage of the input signal IN may generate at least one of the boost signals BST1 and BST2. In this case, the input signal IN may directly be used for the drive signal DRV.

According to the configuration, the delay time from the input of the input signal IN into the transmission drivers 152A to 152C to the transmission of the transmission signal OUT can be reduced.

Although the transmission drivers 152A to 152C use the NOT circuits INV1 to INV3 as control circuits that generate one of the control signals CT1, CT2, and CT4 for controlling the short-circuit control elements SW1 and SW2 in the first to third embodiments, the configuration is not limited to this. The transmission drivers 152A to 152C may use, in place of the NOT circuits INV1 to INV3, control circuits that generate one of the control signals CT1, CT2, and CT4 according to the input signal IN or may use control circuits that generate one of the control signals CT1, CT2, and CT4 according to the pattern of shift in the voltage of the input signal IN known in advance, for example.

Although the transmission drivers 152A to 152C are mounted on the stylus 2 or the touch sensor mounted apparatus 3 in the first to third embodiments, the configuration is not limited to this. The transmission drivers 152A to 152C may be mounted on any electronic device that may need to have a function of outputting the transmission signal OUT with voltage higher than the voltage of the power supply system according to the input signal IN.

Although the transmission driver 152B includes two booster circuits that are the first booster circuit 155 and the second booster circuit 156 in the second embodiment, the configuration is not limited to this. The transmission driver 152B may include three or more booster circuits and short-circuit control elements, each short-circuit control element being associated with each booster circuit and configured to control opening and short-circuiting of the current path between the output terminal of the associated booster circuit and the power supply line W_VDD. In the transmission driver 152B in this case, each booster circuit other than the first booster circuit 155 receives boosted voltage from the booster circuit of the former stage through the power supply terminal or receives the voltage VDD from the power supply line W_VDD through the corresponding short-circuit control element.

According to the configuration, the larger the number of provided booster circuits is, the more the transmission driver 152B can independently reduce the power consumption.

Although the third booster circuit 157 includes two capacitive elements Cext3 and Cext4 in the third embodiment, the configuration is not limited to this. The third booster circuit 157 may include three or more capacitive elements connected in series. In the third booster circuit 157, the capacitive elements connected in series divide the voltage supplied to the output terminal RV1 and the voltage of the output terminal of the buffer circuit BUF3, and the divided different voltage is supplied from each connection part of the capacitive elements connected in series. The signal generation circuit 153C controls the short-circuit control elements and the voltage of the boost signal BST1 to supply, in ascending order or descending order, the values of the voltage supplied from the third booster circuit 157 and the voltage supplied from the power supply line W_VDD through the short-circuit control element SW1, to the positive power supply terminal P of the output control circuit 154.

According to the configuration, the larger the number of capacitive elements provided on the third booster circuit 157 is, the more the transmission driver 152C can independently reduce the power consumption.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A transmission driver that receives an input signal, a first voltage, and a second voltage higher than the first voltage and that transmits a transmission signal according to the input signal, the transmission driver comprising:
   an output terminal which, in operation, outputs the transmission signal;
   circuitry coupled to the output terminal, wherein the circuitry, in operation, operates in:
      a first mode of transmitting the transmission signal with a first voltage range that ranges from the first voltage to the second voltage;
      a second mode of transmitting the transmission signal with a second voltage range that ranges from the first voltage to a third voltage higher than the second voltage, and
      a third mode of transmitting the transmission signal with a third voltage range that ranges from the first voltage to a sixth voltage higher than the third voltage; and
   a first booster circuit which, in operation, supplies the third voltage or the sixth voltage; and
   a second booster circuit which, in operation, supplies, to the first booster circuit, a seventh voltage higher than the first voltage by a difference between the third voltage and the second voltage or an eighth voltage higher than the seventh voltage by a difference between the sixth voltage and the second voltage,
   wherein the first voltage is different from the second voltage, and
   wherein the first voltage is different from the third voltage.

2. The transmission driver according to claim 1, further comprising:
   a first booster circuit which, in operation, supplies the third voltage.

3. The transmission driver according to claim 2, further comprising:
   an output control circuit which, in operation, receives the first voltage and one of the second voltage and the third voltage and outputs the transmission signal from the output terminal; and
   a short-circuit control element which, in operation, controls supply of the second voltage to the output control circuit.

4. The transmission driver according to claim 3, wherein the first booster circuit includes a capacitive element.

5. The transmission driver according to claim 4, wherein,
   in the first mode, the second voltage is supplied to the output control circuit through the short-circuit control element, and
   in the second mode, the short-circuit control element cuts off the supply of the second voltage to the output control circuit, and the first booster circuit supplies the third voltage to the output control circuit.

6. The transmission driver according to claim 5, wherein
   the output control circuit includes a positive power supply terminal and a negative power supply terminal,
   the first voltage is supplied to the negative power supply terminal,
   the second voltage is supplied to a first end of the short-circuit control element, and
   a second end of the short-circuit control element and a first end of the capacitive element are connected to the positive power supply terminal.

7. The transmission driver according to claim 6, further comprising:
   a signal generation circuit which, in operation, generates a first signal and a second signal according to the input signal, wherein:
   the output control circuit sets, as the transmission signal, a first supplied voltage that is supplied to the positive power supply terminal or a second supplied voltage that is supplied to the negative power supply terminal, according to the first signal, and outputs the transmission signal, and
   the second signal is input to a second end of the capacitive element.

8. The transmission driver according to claim 7, further comprising:
   a control circuit which, in operation, controls the short-circuit control element to short-circuit the short-circuit control element when a first signal voltage of the first signal is the first voltage and to open the short-circuit control element when the first signal voltage of the first signal is a fourth voltage higher than the first voltage, wherein
   the signal generation circuit generates the first signal such that the first signal voltage of the first signal is shifted from the first voltage to the fourth voltage at a first timing corresponding to a rise of the input signal and that the first signal voltage of the first signal is shifted from the fourth voltage to the first voltage at a fourth timing at which a predetermined time period has passed from a third timing corresponding to a fall of the input signal, and
   the signal generation circuit generates the second signal such that a second signal voltage of the second signal is shifted from the first voltage to a fifth voltage higher than the first voltage at a second timing at which a predetermined time period has passed from the first timing and that the second signal voltage of the second signal is shifted from the fifth voltage to the first voltage at the third timing.

9. The transmission driver according to claim 8, wherein
   a time period from the first timing to the second timing is equal to or smaller than half a time period from the first timing to the third timing, and a time period from the third timing to the fourth timing is equal to or smaller than half a time period from the second timing to the fourth timing.

10. The transmission driver according to claim 9, wherein the fourth voltage and the fifth voltage are equal to the second voltage.

11. The transmission driver according to claim 4, wherein capacitance of the capacitive element is equal to or greater than ten times parasitic capacitance connected to the output terminal.

12. The transmission driver according to claim 1, wherein:
the first booster circuit includes a first capacitive element that supplies the third voltage or the sixth voltage from a first end of the first capacitive element,
the second booster circuit includes a second capacitive element that supplies the seventh voltage or the eighth voltage from a first end of the second capacitive element to the first booster circuit, and
a first capacitance of the first capacitive element is 0.6 times a total of the first capacitance of the first capacitive element and a second capacitance of the second capacitive element.

13. The transmission driver according to claim 1, wherein the circuitry, in operation, operates in:
a fourth mode of transmitting the transmission signal with a fourth voltage range that ranges from the first voltage to a ninth voltage that is between the first voltage and the second voltage; and
a fifth mode of transmitting the transmission signal with a fifth voltage range that ranges from the first voltage to a tenth voltage that is between the second voltage and the third voltage.

14. The transmission driver according to claim 13, further comprising:
a third booster circuit which, in operation, supplies the ninth voltage, the tenth voltage, or the third voltage.

15. The transmission driver according to claim 14, wherein:
the third booster circuit divides the first voltage and the second voltage to generate the ninth voltage and boosts the ninth voltage that is generated by an amount of the second voltage to generate the tenth voltage.

16. An electronic device comprising:
first electrodes that transmit and receive signals;
a transmission driver which, in operation, receives an input signal, a first voltage, and a second voltage higher than the first voltage, generates a transmission signal according to the input signal, and transmits the transmission signal to a corresponding one of the first electrodes,
wherein the transmission driver, in operation, operates in:
a first mode of transmitting the transmission signal with a first voltage range that ranges from the first voltage to the second voltage,
a second mode of transmitting the transmission signal with a second voltage range that ranges from the first voltage to a third voltage higher than the second voltage, and
a third mode of transmitting the transmission signal with a third voltage range that ranges from the first voltage to a sixth voltage higher than the third voltage; and
a first booster circuit which, in operation, supplies the third voltage or the sixth voltage; and
a second booster circuit which, in operation, supplies, to the first booster circuit, a seventh voltage higher than the first voltage by a difference between the third voltage and the second voltage or an eighth voltage higher than the seventh voltage by a difference between the sixth voltage and the second voltage,
wherein the first voltage is different from the second voltage, and
wherein the first voltage is different from the third voltage.

17. The electronic device according to claim 16, wherein:
the transmission driver is mounted on a stylus,
the first electrodes are mounted on the stylus and transmit and receive the signals through capacitive coupling between the first electrodes and second electrodes mounted on a sensor that is connected to a sensor controller.

18. A control method of an electronic device that includes a first booster circuit, a second booster circuit, and a transmission driver that operates in a first mode, a second mode, and a third mode, the electronic device including electrodes that transmit and receive signals, wherein the transmission driver receives an input signal, a first voltage, and a second voltage higher than the first voltage and transmits a transmission signal to the electrodes according to the input signal, the control method comprising:
in the first mode, transmitting, by the transmission driver, the transmission signal with a first voltage range that ranges from the first voltage to the second voltage;
in the second mode, transmitting, by the transmission driver, the transmission signal with a second voltage range that ranges from the first voltage to third voltage higher than the second voltage;
in the third mode, transmitting, by the transmission driver, the transmission signal with a third voltage range that ranges from the first voltage to a sixth voltage higher than the third voltage;
supplying, by the first booster circuit, the third voltage or the sixth voltage; and
supplying, by the second booster circuit, to the first booster circuit, a seventh voltage higher than the first voltage by a difference between the third voltage and the second voltage or an eighth voltage higher than the seventh voltage by a difference between the sixth voltage and the second voltage,
wherein the first voltage is different from the second voltage, and
wherein the first voltage is different from the third voltage.

* * * * *